US012008956B2

(12) United States Patent
Bae

(10) Patent No.: US 12,008,956 B2
(45) Date of Patent: Jun. 11, 2024

(54) ELECTRONIC DEVICE AND METHOD CAPABLE OF REDUCING AFTERIMAGE OF DISPLAY

(71) Applicant: Samsung Electronics Co., Ltd., Suwon-si (KR)

(72) Inventor: Jungbae Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/351,110

(22) Filed: Jul. 12, 2023

(65) Prior Publication Data

US 2023/0351953 A1 Nov. 2, 2023

Related U.S. Application Data

(63) Continuation of application No. PCT/KR2022/001719, filed on Feb. 3, 2022.

(30) Foreign Application Priority Data

Feb. 9, 2021 (KR) ........................ 10-2021-0018148
Jun. 23, 2021 (KR) ........................ 10-2021-0081675

(51) Int. Cl.
*G09G 3/3208* (2016.01)

(52) U.S. Cl.
CPC ... *G09G 3/3208* (2013.01); *G09G 2300/0819* (2013.01); *G09G 2300/0842* (2013.01);
(Continued)

(58) Field of Classification Search
CPC ......... G09G 3/3208; G09G 2300/0819; G09G 2300/0842; G09G 2300/0861;
(Continued)

(56) References Cited

U.S. PATENT DOCUMENTS 10,861,397 B2 * 12/2020 Jeon ..................... G09G 3/3275
11,176,879 B2 11/2021 Cho
(Continued)

FOREIGN PATENT DOCUMENTS

CN 111261081 A 6/2020
JP 2004-252104 A 9/2004
(Continued)

OTHER PUBLICATIONS

International Search Report dated May 16, 2022, issued in International Patent Application No. PCT/KR2022/001719.

*Primary Examiner* — Abbas I Abdulselam
(74) *Attorney, Agent, or Firm* — Jefferson IP Law, LLP

(57) ABSTRACT

An electronic device and a method capable of reducing an afterimage of a display are provided. The method includes the operations of where a display panel is divided into a first area and a second area, in response to a specified event, controlling a display panel in a partial display state in which a first area is deactivated and a second area is activated, while the display panel is in the partial display state, dividing each frame into a first sub-period and a second sub-period, and controlling first pixels corresponding to the first area, controlling the first pixels to receive a data voltage corresponding to an inactive state, by supplying the first gate signal to the first pixels in the first sub-period, and controlling the first pixels to receive a bias voltage, by supplying the first gate signal to the first pixels in the second sub-period.

15 Claims, 19 Drawing Sheets

(52) U.S. Cl.
CPC . *G09G 2300/0861* (2013.01); *G09G 2310/08* (2013.01); *G09G 2320/0233* (2013.01); *G09G 2320/0257* (2013.01); *G09G 2354/00* (2013.01)

(58) Field of Classification Search
CPC ....... G09G 2310/08; G09G 2320/0257; G09G 2320/0233
See application file for complete search history.

(56) References Cited

U.S. PATENT DOCUMENTS

| | | | |
|---|---|---|---|
| 11,417,254 | B2 | 8/2022 | Kim et al. |
| 2004/0179005 | A1 | 9/2004 | Jo |
| 2008/0055225 | A1 | 3/2008 | Pak et al. |
| 2008/0079676 | A1 | 4/2008 | Pak et al. |
| 2014/0354713 | A1 | 12/2014 | Kim et al. |
| 2015/0022561 | A1 | 1/2015 | Ikeda et al. |
| 2015/0160766 | A1 | 6/2015 | Park et al. |
| 2018/0342192 | A1 | 11/2018 | Lee et al. |
| 2019/0096331 | A1 | 3/2019 | Kwon et al. |
| 2020/0175909 | A1 | 6/2020 | Li et al. |
| 2020/0202797 | A1 | 6/2020 | Cho et al. |
| 2020/0211469 | A1 | 7/2020 | Jeon et al. |
| 2020/0388228 | A1 | 12/2020 | Oh et al. |
| 2021/0012718 | A1 | 1/2021 | Kang et al. |

FOREIGN PATENT DOCUMENTS

| | | | |
|---|---|---|---|
| JP | 2019-219678 | A | 12/2019 |
| KR | 10-2002-0001265 | A | 1/2002 |
| KR | 10-2007-0074420 | A | 7/2007 |
| KR | 10-2008-0020876 | A | 3/2008 |
| KR | 10-2008-0030795 | A | 4/2008 |
| KR | 10-2008-0048223 | A | 6/2008 |
| KR | 10-2009-0072885 | A | 7/2009 |
| KR | 10-2014-0140814 | A | 12/2014 |
| KR | 10-2016-0008087 | A | 1/2016 |
| KR | 10-1872987 | B1 | 7/2018 |
| KR | 10-2018-0130071 | A | 12/2018 |
| KR | 10-2019-0034376 | A | 4/2019 |
| KR | 10-2020-0005695 | A | 1/2020 |
| KR | 10-2020-0076812 | A | 6/2020 |
| KR | 10-2020-0083736 | A | 7/2020 |
| KR | 10-2020-0140152 | A | 12/2020 |
| WO | 2019/137045 | A1 | 7/2019 |
| WO | 2020/169027 | A1 | 8/2020 |

* cited by examiner

ELECTRONIC DEVICE AND METHOD CAPABLE OF REDUCING AFTERIMAGE OF DISPLAY

CROSS-REFERENCE TO RELATED APPLICATION(S)

This application is a continuation application, claiming priority under § 365(c), of an International application No. PCT/KR2022/001719, filed on Feb. 3, 2022, which is based on and claims the benefit of a Korean patent application number 10-2021-0018148, filed on Feb. 9, 2021, in the Korean Intellectual Property Office, and of a Korean patent application number 10-2021-0081675, filed on Jun. 23, 2021, in the Korean Intellectual Property Office, the disclosure of each of which is incorporated by reference herein in its entirety.

BACKGROUND

1. Field

The disclosure relates to an electronic device and method capable of reducing an afterimage of a display.

2. Description of Related Art

As a display technology develops, research and development on electronic devices having flexible displays are being actively conducted. A flexible display may be folded, bent, rolled, or unfolded. An electronic device including a flexible display may change the size of a screen displayed to a user.

The flexible display may include an organic light emitting diode (OLED). In flexible displays including OLEDs, image sticking or luminance deviation may occur due to variations in hysteresis features of thin film transistors disposed in pixels.

The above information is presented as background information only to assist with an understanding of the disclosure. No determination has been made, and no assertion is made, as to whether any of the above might be applicable as prior art with regard to the disclosure.

SUMMARY

Electronic devices are being researched and developed to have a form factor capable of folding, bending, rolling, or unfolding a display by applying a flexible display. For example, the electronic device includes a structure in which a portion of the housing is slidable. In an electronic device having such a form factor, a portion of the flexible display may slide into the inner space of the housing or slide out of the inner space of the housing in association with sliding of a portion of the housing. For example, a flexible display may include a first area that slides into an inner space of the housing according to the sliding movement of the portion of a housing and a second area that is visually visible from the outside in a fixed manner regardless of the sliding movement of the housing.

An electronic device including a structure in which a portion of the housing is slidable may deactivate the first area and activate the second area while the first area slides into the inner space of the housing. Accordingly, a hysteresis feature deviation occurs between the thin film transistors disposed in the first area and the thin film transistors disposed in the second area, and the deviation may cause an afterimage on the screen of the flexible display.

Aspects of the disclosure are to address at least the above-mentioned problems and/or disadvantages and to provide at least the advantages described below. Accordingly, an aspect of the disclosure is to provide an electronic device and a method capable of reducing afterimage or luminance deviation of a display.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a display in which a display panel including a plurality of pixels is divided into a first area and a second area, a display driver integrated circuit (DDI) for driving the display panel, and a processor, wherein each of the plurality of pixels includes a first thin film transistor (TFT), a second TFT for switching a connection between a source of the first TFT and a data line of the display panel to which a data voltage is supplied based on a first gate signal, a third TFT for switching a connection between the gate of the first TFT and the drain of the first TFT based on a second gate signal, a fourth TFT supplying a first initialization voltage to the gate of the first TFT based on a third gate signal, a fifth TFT for switching a connection between a positive driving voltage line of the display panel, to which a positive driving voltage is supplied based on a light emission signal, and the source of the first TFT, a sixth TFT connecting between the drain of the first TFT and the anode of the OLED based on the light emission signal, a seventh TFT supplying a second initialization voltage to the anode of the OLED based on a fourth gate signal, and a storage capacitor disposed between the gate of the first TFT and the positive driving voltage line, wherein the processor, in response to a specified event, controls a display panel in a partial display state in which a first area is deactivated and a second area is activated, while the display panel is in a partial display state, divides each frame into a first sub-period and a second sub-period, and controls the first pixels corresponding to the first area, controls the first pixels to receive a data voltage corresponding to an inactive state through the second TFT, by supplying the first gate signal to the first pixels in the first sub-period, and controls the first pixels to receive a bias voltage through the second TFT, by supplying the first gate signal to the first pixels in the second sub-period, and the first pixels maintains the first TFT in a bias state by receiving the bias voltage in the second sub-period.

In accordance with another aspect of the disclosure, a method of driving an electronic device is provided. The method of driving an electronic device includes a display in which a display panel including a plurality of pixels is divided into a first area and a second area, may include the operations of in response to a specified event, controlling a display panel in a partial display state in which a first area is deactivated and a second area is activated, while the display panel is in a partial display state, dividing each frame into a first sub-period and a second sub-period, and controlling first pixels corresponding to the first area, controlling the first pixels to receive a data voltage corresponding to an inactive state, by supplying the first gate signal to the first pixels in the first sub-period, and controlling the first pixels to receive a bias voltage, by supplying the first gate signal to the first pixels in the second sub-period, wherein each of the first pixels maintains a driving TFT in a bias state by receiving the bias voltage in the second sub-period.

An electronic device and a method according to various embodiments of the disclosure may reduce afterimages or luminance deviation of a display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
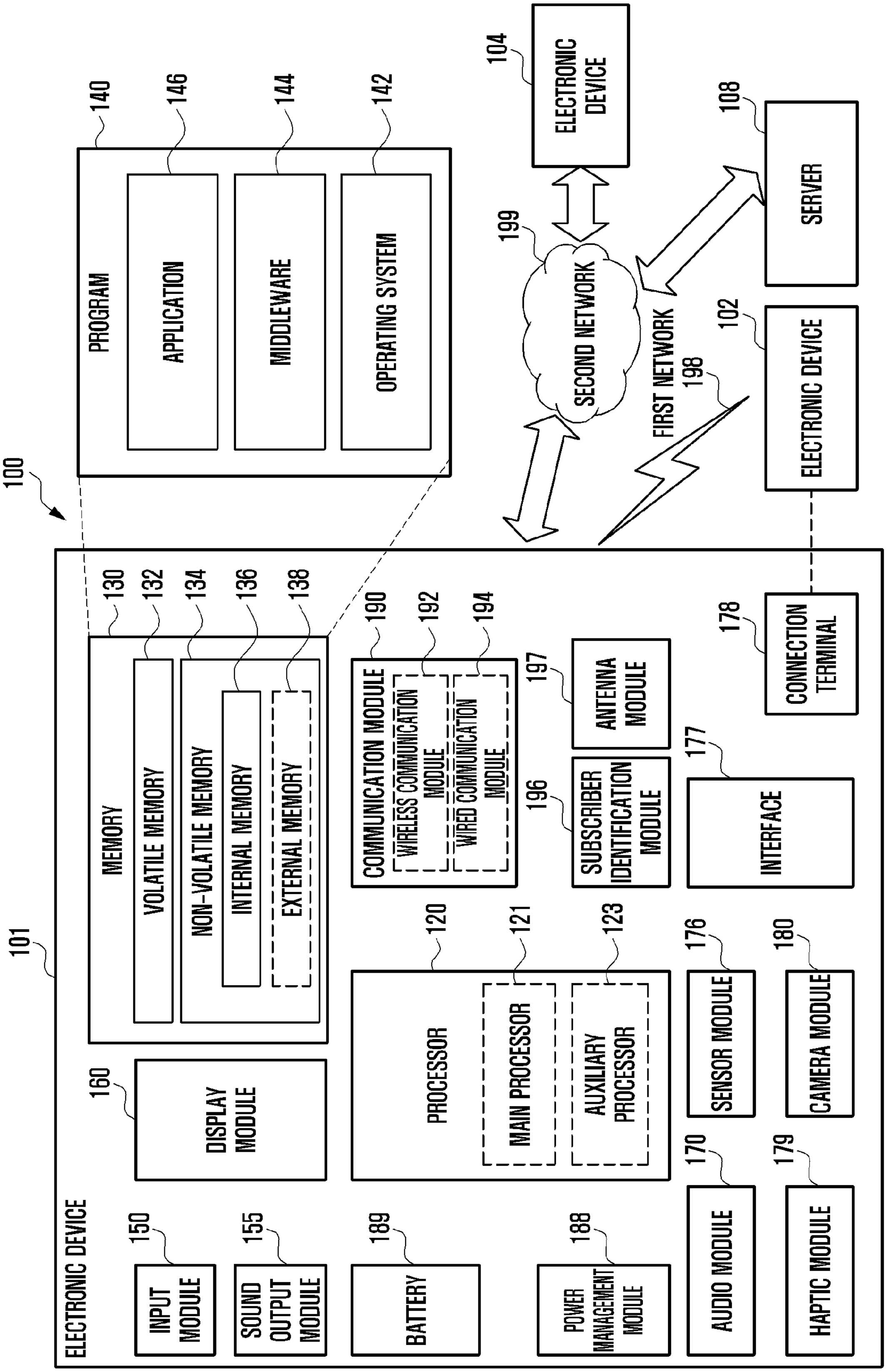
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range lineless communication network), or at least one of an electronic device 104 or a server 108 via a second network 199 (e.g., a long-range lineless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120 and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., linedly) or linelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., linedly) or linelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., lined) communication channel or a lineless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., lined) communication or a lineless communication. According to an embodiment, the communication module 190 may include a lineless communication module 192 (e.g., a cellular communication module, a short-range lineless communication module, or a global navigation satellite system (GNSS) communication module) or a lined communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The lineless communication module 192 may identify and authenticate the electronic device 101 in a communication network, such as the first network 198 or the second network 199, using subscriber information (e.g., international mobile subscriber identity (IMSI)) stored in the subscriber identification module 196.

The lineless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The lineless communication module 192 may support a high-frequency band (e.g., the mmWave band) to achieve, e.g., a high data transmission rate. The lineless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The lineless communication module 192 may support various requirements specified in the electronic device 101, an external electronic device (e.g., the electronic device 104), or a network system (e.g., the second network 199). According to an embodiment, the lineless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the lineless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108 For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspects (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., linedly), linelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
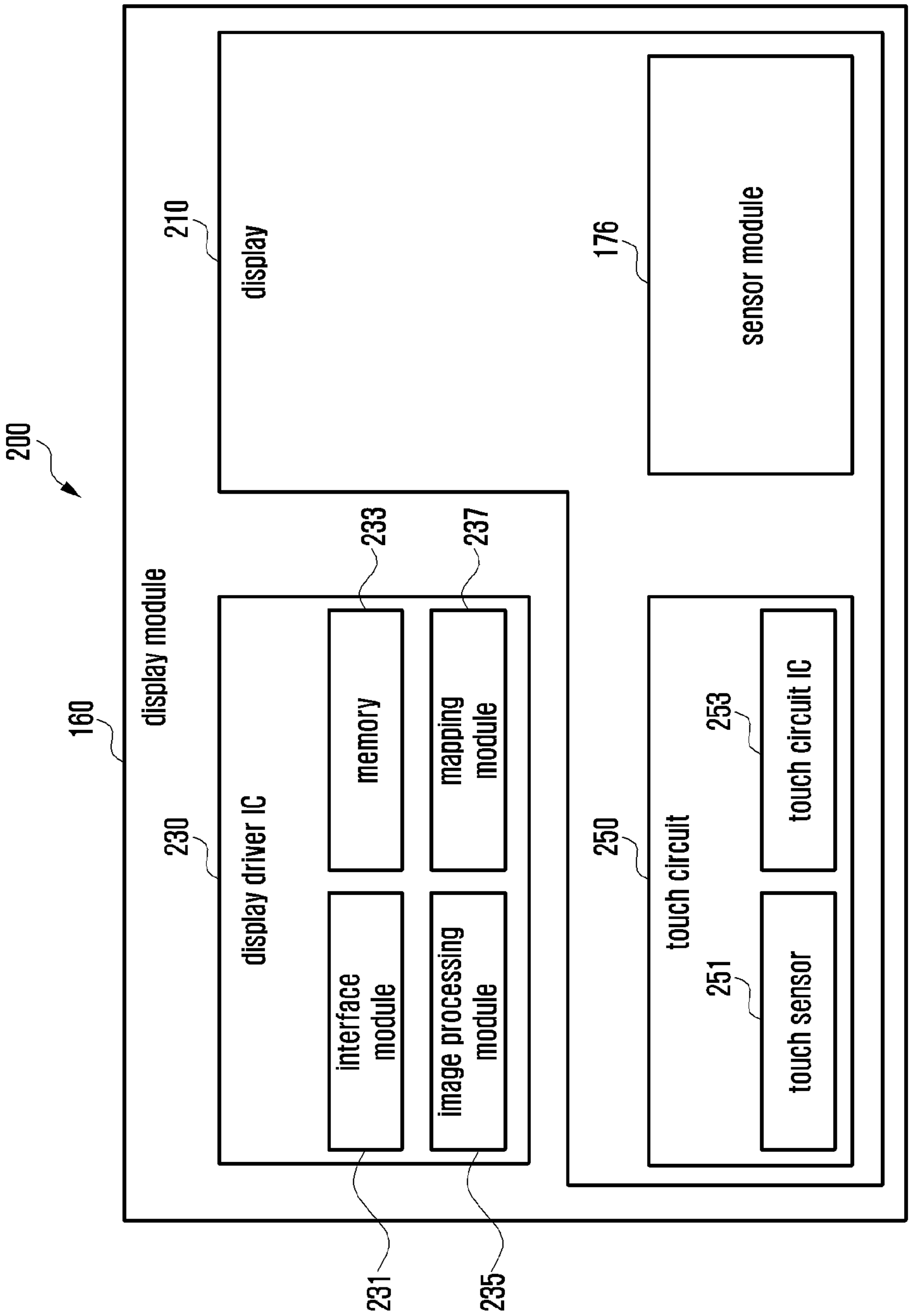
FIG. 2 is a block diagram of a display module according to an embodiment of the disclosure.

FIG. 2 is a block diagram of a display module according to an embodiment of the disclosure.

Referring to FIG. 2, in block diagram 200, the display module 160 may include a display 210 and a display driver IC (DDI) 230 for controlling the display 210. The DDI 230 may include an interface module 231, a memory 233 (e.g., the buffer memory 350), an image processing module 235, or a mapping module 237. The DDI 230 may receive, for example, image data or image information including image control signals corresponding to commands for controlling the image data from other components of the electronic device 101 through the interface module 231. For example, according to an embodiment, the image information may be received from the processor 120 (e.g., the main processor 121) (e.g., an application processor) or the auxiliary processor 123 (e.g., the graphic processing unit) that operates independently from the function of the main processor 121. The DDI 230 may communicate with the touch circuit 250 or the sensor module 176 through the interface module 231. In addition, the DDI 230 may store at least a portion of the received image information in the memory 233, for example, in units of frames. The image processing module 235, for example, may perform preprocessing or postprocessing of at least a portion of the image information (e.g., resolution, brightness, or size adjustment) based at least on the feature of the image data and the feature of the display 210. The mapping module 237 may generate a voltage value or a current value corresponding to the image data preprocessed or post processed through the image processing module 135. According to an embodiment, the generation of the voltage value or the current value, for example, may be performed based at least partially on a property of pixels of the display 210 (e.g., an array of pixels (red, green, blue (RGB) stripe or pentile structure), or the size of each sub-pixel). For example, the visual information (e.g., test, image, or icon) corresponding to the image data may be displayed through the display 210 by at least a portion of pixels of the display 210 being driven based at least partially on the voltage value or the current value.

According to an embodiment, the display module 160 may further include a touch circuit 250. The touch circuit 250 may include a touch sensor 251 and a touch sensor IC 253 for controlling the touch sensor 251. The touch sensor IC 253, for example, may control the touch sensor 251 to detect a touch input or a hovering input to a specific location of the display 210. For example, the touch sensor IC 253 detects a touch input or a hovering input by measuring a change in a signal (e.g., voltage, light amount, resistance, or charge amount) for a specific position of the display 210. The touch sensor IC 253 may provide information (e.g., location, area, pressure, or time) on the sensed touch input or hovering input to the processor 120. According to another embodiment, at least a portion of the touch circuit 250 (e.g., the touch sensor IC 253) may be included as a portion of the display driver IC 230 or the display 210, or as a portion of other components (e.g., the auxiliary processor 123) disposed outside of the display module 160.

According to yet another embodiment, the display module 160 may further include at least one sensor (e.g., a fingerprint sensor, an iris sensor, a pressure sensor, or an illumination sensor) of the sensor module 176 or a control circuit for the sensor module 176. In this case, the at least one sensor or a control circuit thereof may be embedded in a portion of the display module 160 (e.g., the display 210 or the DDI 230) or a portion of the touch circuit 250. For example, in the case that the sensor module 176 embedded in the display module 160 includes a biometric sensor (e.g., a fingerprint sensor), the biometric sensor may obtain biometric information (e.g., the fingerprint image) associated with a touch input through a partial area of the display 210. For another example, in the case that the sensor module 176 embedded in the display module 160 includes a pressure sensor, the pressure sensor may obtain pressure information associated with a touch input through a portion or the entire area of the display 210. According to yet another embodiment, the touch sensor 251 or the sensor module 176 may be disposed between pixels of a pixel layer of the display 210 or above or below the pixel layer.

Figure 3:
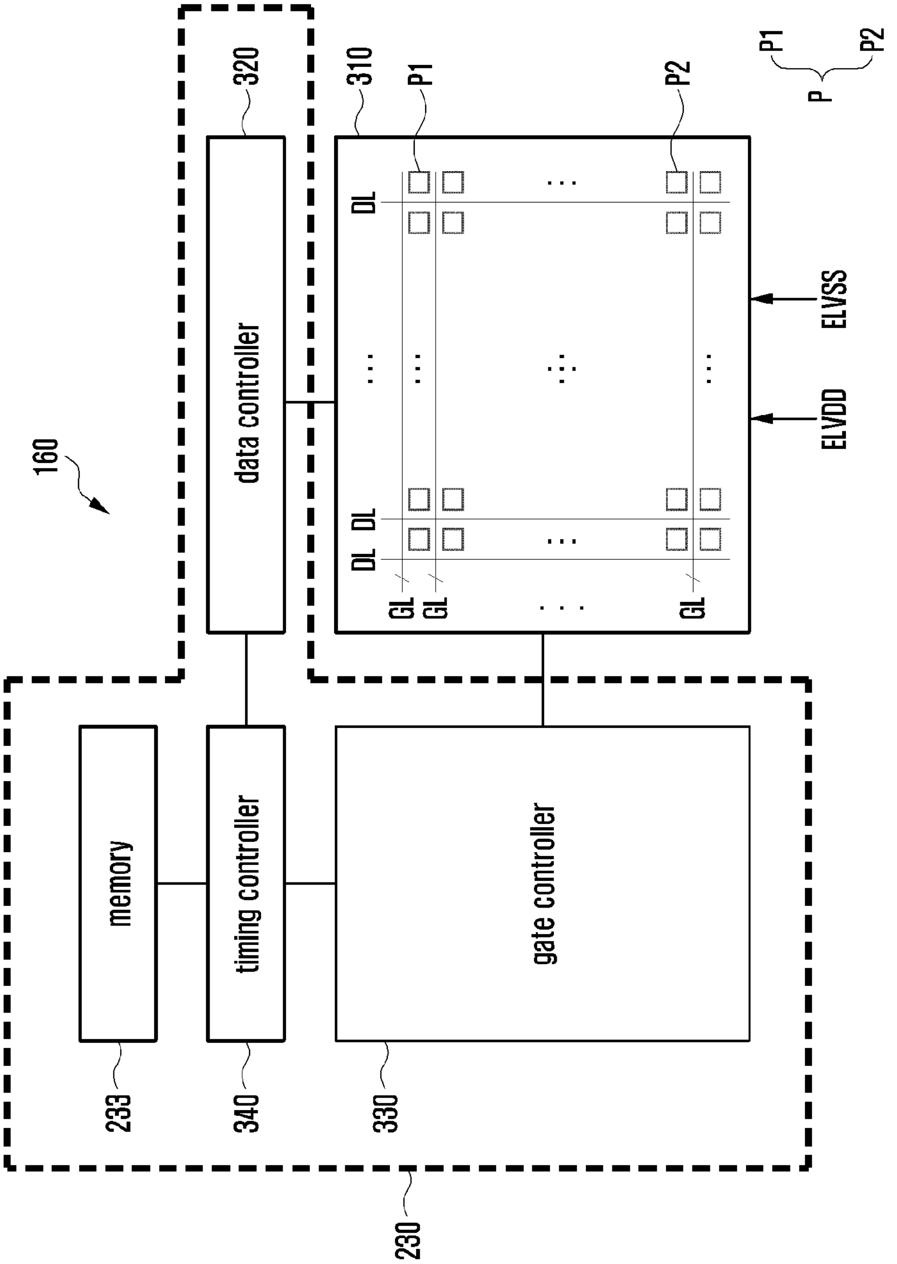
FIG. 3 is a block diagram of a display module according to an embodiment of the disclosure.

FIG. 3 is a block diagram of a display module according to an embodiment of the disclosure.

The display module 160 illustrated in FIG. 3 may include an embodiment at least partially similar to or different from the display module 160 illustrated in FIGS. 1 and/or 2. Hereinafter, with reference to FIG. 3, features of the display module 160 that have not been explained or are changed will be mainly described.

Referring to FIG. 3, the display module 160 according to an embodiment may include a display panel 310, a data controller 320, a gate controller 330, a timing controller 340, and/or a memory 233 (e.g., the memory 233 of FIG. 2).

According to an embodiment, the DDI (e.g., DDI 230 of FIG. 2) may include a data controller 320, a gate controller 330, a timing controller 340, and/or a memory 233 (e.g., FIG. 2). of the memory 233).

According to various embodiments, at least a portion of the data controller 320, the gate controller 330, the timing controller 340, and/or the memory 233 (e.g., the memory 233 of FIG. 2) may be included in the DDI 230 (e.g., the DDI 230 of FIG. 2). According to another embodiment, the data controller 320, the timing controller 340, and/or the memory 233 (e.g., the memory 233 of FIG. 2) may be included in a DDI 230 (e.g., the DDI 230 of FIG. 2), and the gate controller 330 may be disposed in a non-display area of the display panel 310 (e.g., the non-display area 812 of FIG. 8).

According to yet another embodiment, the display panel 310 may include a plurality of gate lines GL and a plurality of data lines DL, and pixels P may be disposed in each partial area of the display panel 310 where the plurality of gate lines GL and the plurality of data lines DL intersect.

According to yet another embodiment, the pixels P may receive a gate signal and a light emission signal (e.g., the light emission signal EM of FIG. 4) through the gate line GL and receive a data signal through the data line DL. According to an embodiment, the pixels P may receive a positive driving voltage of a high potential voltage (e.g., ELVDD voltage) and a low potential voltage (e.g., ELVSS voltage) as power sources for driving organic light emitting diode (OLED). The positive driving voltage may be referred to as an electroluminescence power voltage or an emitting driving voltage.

According to yet another embodiment, each pixel P may include an OLED and a pixel driving circuit (e.g., the pixel driving circuit 400 of FIG. 4) for driving the OLED. According to yet another embodiment, the pixel driving circuit 400 disposed in each pixel P may control the on (e.g., an active state) or the off (e.g., an inactive state) of the OLED based on the gate signal and the light emission signal EM. According to yet another embodiment, when the OLED of each pixel P is turned on (e.g., activated), a grayscale (e.g., luminance) corresponding to the data signal may be displayed for one frame period.

According to yet another embodiment, the display panel 310 may be divided into a first area 532 and a second area 531 as will be described later with reference to FIGS. 5, 6, and 7. Accordingly, the pixels P may include a first pixel P1 disposed in the first area 532 and a second pixel P2 disposed in the second area 531.

According to various embodiments, the electronic device 101, in response to a specified event, may control the display panel 310 in a partial display state in which the first area 532 is deactivated and the second area 531 is activated. The specified event may include an operation of the processor 120 of the electronic device 101 detecting a state in which the first area 532 slides into the housing 510. For example, the specified event includes an operation for the processor 120 of the electronic device 101 to detect a transition of the electronic device 101 to the first state.

The electronic device 101 may differently control a method of driving the first pixels P1 and a method of driving the second pixels P2 during the partial display state, and these methods will be described in detail with reference to FIGS. 10 to 19.

According to yet another embodiment, the data controller 320 may drive a plurality of data lines DL. According to an embodiment, the data controller 320 may receive at least one synchronization signal and a data signal (e.g., digital image data) from the timing controller 340 or the processor 120 (e.g., the processor 120 of FIG. 1). According to yet another embodiment, the data controller 320 may determine a data voltage Data (e.g., analog image data) corresponding to an input data signal using a reference gamma voltage and a designated gamma curve. According to yet another embodiment, the data controller 320 may supply the data voltage Data to each pixel P by applying the data voltage Data to the plurality of data lines DL.

According yet another an embodiment, the data controller 320 may divide each frame into a first sub-period and a second sub-period during the partial display state and drive the first pixels P1 corresponding to the first area 532. For example, the data controller 320 supplies the data voltage Data corresponding to the inactive state (e.g., the off state) to the first pixels P1 by applying the data voltage Data corresponding to the inactive state to the data line DL in the first sub-period. For example, the data controller 320 supplies the bias voltage to the first pixels P1 by applying the bias voltage to the data line DL in the second sub-period. According to yet another embodiment, the bias voltage may have the same potential as a high potential voltage (e.g., ELVDD voltage).

According to yet another embodiment, the gate controller 330 may drive a plurality of gate lines GL. According to yet another embodiment, the gate controller 330 may receive at least one synchronization signal from the timing controller 340 or the processor 120 (e.g., the processor 120 of FIG. 1). According to yet another embodiment, the gate controller 330 may sequentially generate a plurality of gate signals and sequentially generate a plurality of light emission signals EM based on the synchronization signal. The gate controller 330 may sequentially supply the generated gate signal and the light emission signal EM to the first pixel P1 and the second pixel P2 through the gate line GL.

According to yet another embodiment, the timing controller 340 may control driving timings of the gate controller 330 and the data controller 320. According to yet another embodiment, the timing controller 340 may convert a data signal (e.g., digital image data) input from the processor 120 to correspond to the resolution of the display panel 310 and supply the converted data signal to the data controller 320).

Figure 4:
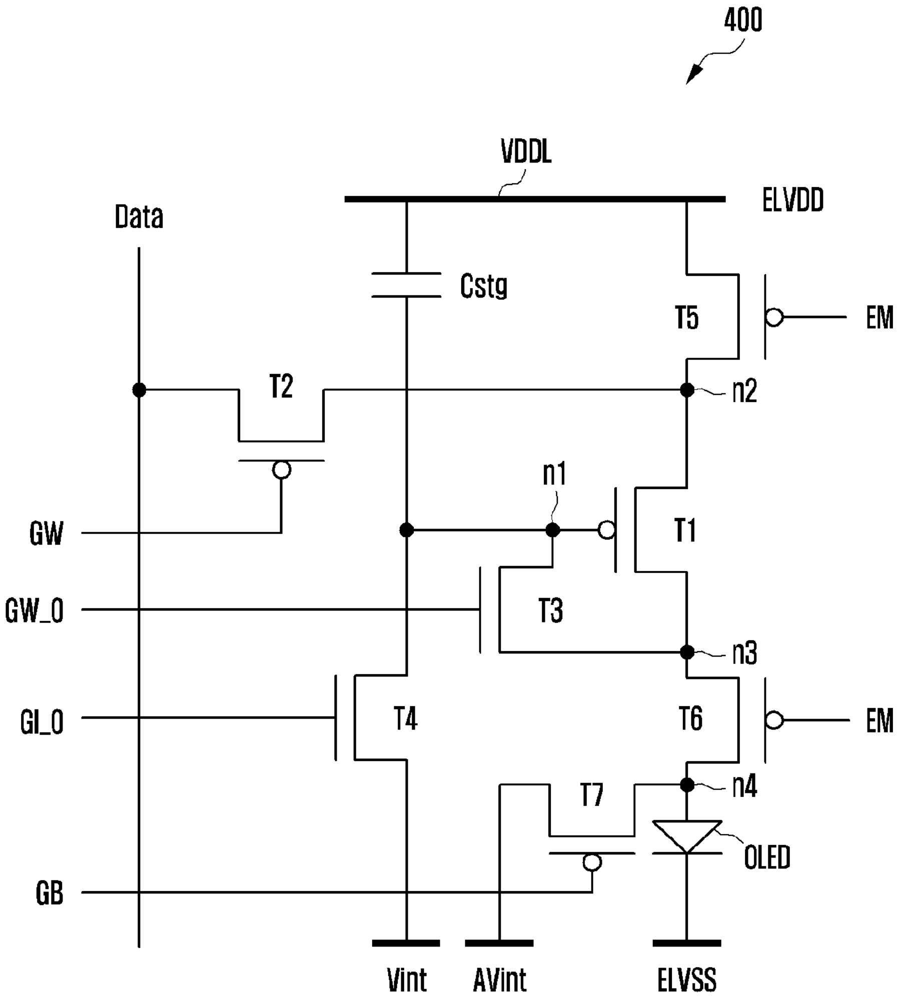
FIG. 4 is a circuit diagram illustrating a pixel driving circuit of each pixel according to an embodiment of the disclosure.

FIG. 4 illustrates a pixel driving circuit of each pixel according to an embodiment of the disclosure.

Referring to FIG. 4, a pixel driving circuit 400 of each pixel according to an embodiment may include an OLED and a plurality of thin film transistors (TFTs) for driving the OLED.

According to an embodiment, each pixel P may include a first TFT T1, a second TFT T2, a third TFT T3, a fourth TFT T4, a fifth TFT T5, a sixth TFT T6, a seventh TFT T7, and a storage capacitor Cstg.

According to various embodiments, each of the first to seventh TFTs T1, T2, T3, T4, T5, T6, and T7 may be any one of a PMOS transistor and an NMOS transistor.

According to various embodiments, the first to seventh TFTs T1, T2, T3, T4, T5, T6, and T7 may be implemented as one of a Low Temperature Poly Silicon (LTPS) TFT, an oxide TFT, or a Low temperature Polycrystalline Oxide (LTPO) TFT.

According to another embodiment, the first TFT T1 may supply a specified current to the OLED based on the data voltage Data input through the data line (e.g., the data line DL of FIG. 3). This first TFT T1 may be referred to as a driving TFT. In the example described below, the gate of the first TFT T1 is defined as the first node n1, the source of the first TFT T1 is defined as the second node n2, and the drain of the first TFT T1 is defined as the third node n3.

According to yet another embodiment, the second TFT T2 may switch the connection between the data line DL, to which the data voltage Data is supplied based on the first gate signal GW, and the source (i.e., the second node n2) of the first TFT T1 is connected to and the source (i.e., the second node n2) of the first TFT T1. For example, the second TFT T2 is turned on in response to the first gate signal GW, and, when turned on, the data line DL and the source (i.e., the second node n2) of the first TFT T1 may be electrically connected.

According to yet another embodiment, the third TFT T3 may switch the connection between the gate (i.e., the first node n1) of the first TFT T1 and the drain (i.e., the third node n3) of the first TFT T1 based on the second gate signal GW_O. For example, the third TFT T3 is turned on in response to the second gate signal GW_O, and, when turned on, the gate (i.e., the first node n1) of the first TFT T1 and the drain (i.e., the third node n3) the first TFT T1 may be electrically connected.

According to yet another embodiment, the fourth TFT T4 may supply the first initialization voltage Vint to the gate of the first TFT T1 based on the third gate signal G1_O. For example, the fourth TFT T4 is turned on in response to the third gate signal G1_O, and, when turned on, the gate (i.e., the first node n1) of the first TFT T1 may be initialized by supplying a first initialization voltage Vint to the gate (i.e., the first node n1) of the first TFT T1.

According to yet another embodiment, the fifth TFT T5 may switch the connection between the ELVDD line (VDDL), to which the ELVDD voltage is supplied based on the light emission signal EM, and the source (i.e., the second node n2) of the first TFT T1. For example, the fifth TFT T5 is turned on in response to the light emission signal EM, and, when turned on, the ELVDD voltage may be supplied to the source (i.e., the second node n2) of the first TFT T1.

According to yet another embodiment, the sixth TFT T6 may connect the drain of the first TFT T1 (i.e., the third node n3) and the anode of the OLED (e.g., the fourth node n4) based on the light emission signal EM. For example, the sixth TFT T6 is turned on in response to the light emission signal EM, and, when turned on, the drain (i.e., the third node n3) of the first TFT T1 and the anode (e.g., the fourth node n4) of OLED may be electrically connected.

According to yet another embodiment, the seventh TFT T7 may supply the second initialization voltage AVint to the anode (e.g., the fourth node n4) of the OLED based on the fourth gate signal GB. For example, the seventh TFT T7 is turned on in response to the fourth gate signal GB, and, when turned on, the OLED may be initialized by supplying the second initialization voltage AVint to the anode of the OLED (e.g., the fourth node n4).

According to yet another embodiment, the storage capacitor Cstg may be disposed between the gate (i.e., the first node n1) of the first TFT T1 and the ELVDD line (VDDL) to which the ELVDD voltage is supplied. The storage capacitor Cstg may store the data voltage Data supplied to the gate (i.e., the first node n1) of the first TFT T1 for one frame period.

An electronic device (e.g., the electronic device 500 of FIG. 5) according to various embodiments may include a housing (e.g., the housing 510 of FIG. 5); a display (e.g., a display 530 of FIG. 6) in which a display panel (e.g., the display panel of FIG. 1) including a plurality of pixels is divided into a first area (e.g., the first area 532 of FIG. 6) a second area (e.g., the second area 531 of FIG. 6); a display driver integrated circuit (DDI) (e.g., the DDI 230 of FIG. 2), for driving the display panel; and a processor (e.g., the processor 120 of FIG. 1), wherein each of the plurality of pixels includes a first TFT (e.g., the first TFT T1 of FIG. 11), a second TFT (e.g., the second TFT T2 in FIG. 11), for switching a connection between a source of the first TFT and a data line of the display panel to which a data voltage is supplied based on a first gate signal; a third TFT (e.g., the third TFT T3 in FIG. 11) for switching a connection between the gate of the first TFT and the drain of the first TFT based on a second gate signal; a fourth TFT (e.g., the fourth TFT T4 in FIG. 11) supplying a first initialization voltage to the gate of the first TFT based on a third gate signal; a fifth TFT (e.g., the fifth TFT T5 in FIG. 11) for switching a connection between an ELVDD line of the display panel, to which an ELVDD voltage is supplied based on a light emission signal, and the source of the first TFT; a sixth TFT (e.g., the 6th TFT T6 in FIG. 11) connecting between the drain of the first TFT and the anode of the OLED based on the light emission signal; a seventh (e.g., the TFT 7th TFT T7 in FIG. 11) supplying a second initialization voltage to the anode of the OLED based on a fourth gate signal; and a storage capacitor (e.g., the storage capacitor Cstg of FIG. 11) disposed between the gate of the first TFT and the ELVDD line, wherein the processor, in response to a specified event, controls a display panel in a partial display state in which a first area is deactivated and a second area is activated; while the display panel is in a partial display state, divides each frame into a first sub-period and a second sub-period, and controls the first pixels P1 corresponding to the first area; controls the first pixels P1 to receive a data voltage corresponding to an inactive state through the second TFT, by supplying the first gate signal to the first pixels P1 in the first sub-period; and controls the first pixels P1 to receive a bias voltage through the second TFT, by supplying the first gate signal to the first pixels P1 in the second sub-period, and the first pixels P1 maintains the first TFT in a bias state by receiving the bias voltage in the second sub-period.

According to yet another embodiment, the bias state may be a state in which the difference between the gate voltage of the first TFT T1 and the source voltage of the first TFT T1 is "Vdata+Vth−Vbias", and in the above formula, Vdata may be a value corresponding to the data voltage, Vth may be a threshold voltage of the first TFT T1, and Vbias may be a value corresponding to the bias voltage.

According to yet another embodiment, the bias voltage may be equal to the ELVDD voltage.

According to yet another embodiment, in the non-display area of the display panel 310, a first gate driving circuit for supplying the first to fourth gate signals and the light emission signal to the first pixels P1 corresponding to the first area 532, a second gate driving circuit for supplying the first to fourth gate signals and the light emission signal to the second pixels P2 corresponding to the second area 531, a first GW start signal line for transferring the first GW start signal output from the DDI 230 to the first gate driving circuit, and a second GW start signal line for transferring the second GW start signal output from the DDI 230 to the second gate driving circuit may be disposed.

According to yet another embodiment, the DDI 230 may output the first GW start signal when the first sub-period starts, the first gate driving circuit may sequentially supply the first gate signal to the first pixels P1 in response to the first GW start signal input through the first GW start signal line during the first sub-period, the DDI 230 may output the first GW start signal when the second sub-period starts, and the first gate driving circuit may sequentially supply the first gate signal to the first pixels P1 in response to the first GW start signal input through the first GW start signal line during the second sub-period.

According to yet another embodiment, the DDI 230 may output the second GW start signal when each frame starts, and the first gate driving circuit may sequentially supply the first gate signal to the second pixels P2 in response to the second GW start signal input through the second GW start signal line.

According to yet another embodiment, in the non-display area of the display panel 310, a first EM start signal line for transferring the first EM start signal output from the DDI 230 to the first gate driving circuit and a second EM start signal line for transferring the second EM start signal output from the DDI 230 to the second gate driving circuit may be further disposed.

According to yet another embodiment, the light emission signal may not be supplied to the first pixels P1 as the DDI 230 does not output the first EM start signal while the display panel 310 is controlled to be in the partial display state and the first gate driving circuit does not receive the first EM start signal while the display panel 310 is controlled to be in the partial display state.

According to yet another embodiment, the DDI 230 may output the second EM start signal when each frame starts, and the second gate driving circuit may sequentially supply the light emission signal to the second pixels P2 in response to the second EM start signal input through the second EM start signal line.

According to yet another embodiment, the first area 532 of the display 530 may slide out of the inner space of the housing 510 in association with the movement of at least a portion of the housing 510 in a first direction, the first area 532 of the display 530 may slide into the inner space of the housing 510 in association with the movement of at least a portion of the housing 510 in a second direction opposite to the first direction, and the second area 531 of the display 530 may be visually visible from the outside in a fixed manner regardless of the movement of the housing 510.

According to yet another embodiment, the specified event may include an operation of the processor 120 detecting a state in which the first area 532 of the display 530 slides into the inner space of the housing 510.

A method of driving an electronic device 500 according to various embodiments, as a method of driving an electronic device 500 including a display 530 in which a display panel 310 including a plurality of pixels is divided into a first area 532 and a second area 531, may include the operations of: in response to a specified event, controlling a display panel 310 in a partial display state in which a first area 532 is deactivated and a second area 531 is activated; while the display panel 310 is in a partial display state, dividing each frame into a first sub-period and a second sub-period, and controlling first pixels P1 corresponding to the first area 532; controlling the first pixels P1 to receive a data voltage corresponding to an inactive state, by supplying the first gate signal to the first pixels P1 in the first sub-period; and controlling the first pixels P1 to receive a bias voltage, by supplying the first gate signal to the first pixels P1 in the second sub-period, wherein each of the first pixels P1 maintains a driving TFT in a bias state by receiving the bias voltage in the second sub-period.

According to yet another embodiment, the bias state may be a state in which the difference between the gate voltage of the first TFT and the source voltage of the first TFT is "Vdata+Vth−Vbias", and in the above formula, Vdata may be a value corresponding to the data voltage, Vth may be a threshold voltage of the first TFT, and Vbias may be a value corresponding to the bias voltage.

According to yet another embodiment, the bias voltage may be equal to the ELVDD voltage.

According to yet another embodiment, an operation that a display driver integrated circuit (DDI) 230 driving the display panel 310 outputs a first GW start signal when the first sub-period starts; an operation that the first gate driving circuit sequentially supplies the first gate signal to the first pixels P1 in response to the first GW start signal during the first sub-period; an operation that the DDI 230 outputs the first GW start signal when the second sub-period starts; and an operation that the first gate driving circuit supplies sequentially the first gate signal to the first pixels P1 in response to the first GW start signal during the second sub-period, may be further included.

According to yet another embodiment, an operation that the DDI 230 outputs a second GW start signal at the start of each frame and an operation that a second gate driving circuit supplies sequentially the first gate signal to the second pixels P2 in response to the second GW start signal during each frame may be further included.

According to yet another embodiment, an operation that, while the display panel 310 is controlled to be in the partial display state, the DDI 230 does not output the first EM start signal and an operation that, while the display panel 310 is controlled to be in the partial display state, the first gate driving circuit does not supply a light emission signal to the first pixels P1 by not receiving the first EM start signal, may be further included.

According to yet another embodiment, an operation that the DDI 230 outputs a second EM start signal when each frame starts and an operation that the second gate driving circuit supplies sequentially a light emission signal to the second pixels P2 in response to the second EM start signal, may be further included.

According to yet another embodiment, the first area 532 of the display 530 may slide out of the inner space of the housing 510 in association with the movement of at least a portion of the housing 510 of the electronic device 500 in a first direction, the first area 532 of the display 530 may slide into the inner space of the housing 510 in association with the movement of at least a portion of the housing 510 in a second direction opposite to the first direction, and the second area 531 of the display 530 may be visually visible from the outside in a fixed manner regardless of the movement of the housing 510.

According to yet another embodiment, the specified event may include an operation of detecting a state in which the first area 532 of the display 530 slides into the inner space of the housing 510.

Figure 5:
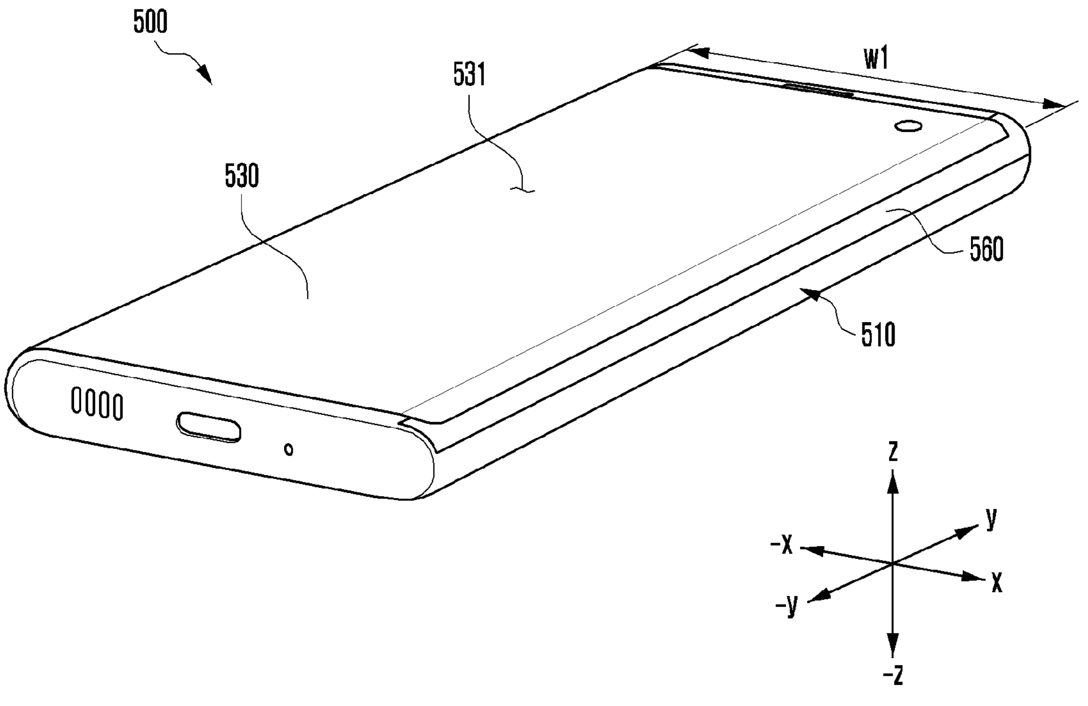
FIG. 5 is a front perspective view of an electronic device illustrating a first state according to an embodiment of the disclosure.

FIG. 5 is a front perspective view of an electronic device illustrating a first state according to an embodiment of the disclosure.

Figure 6:
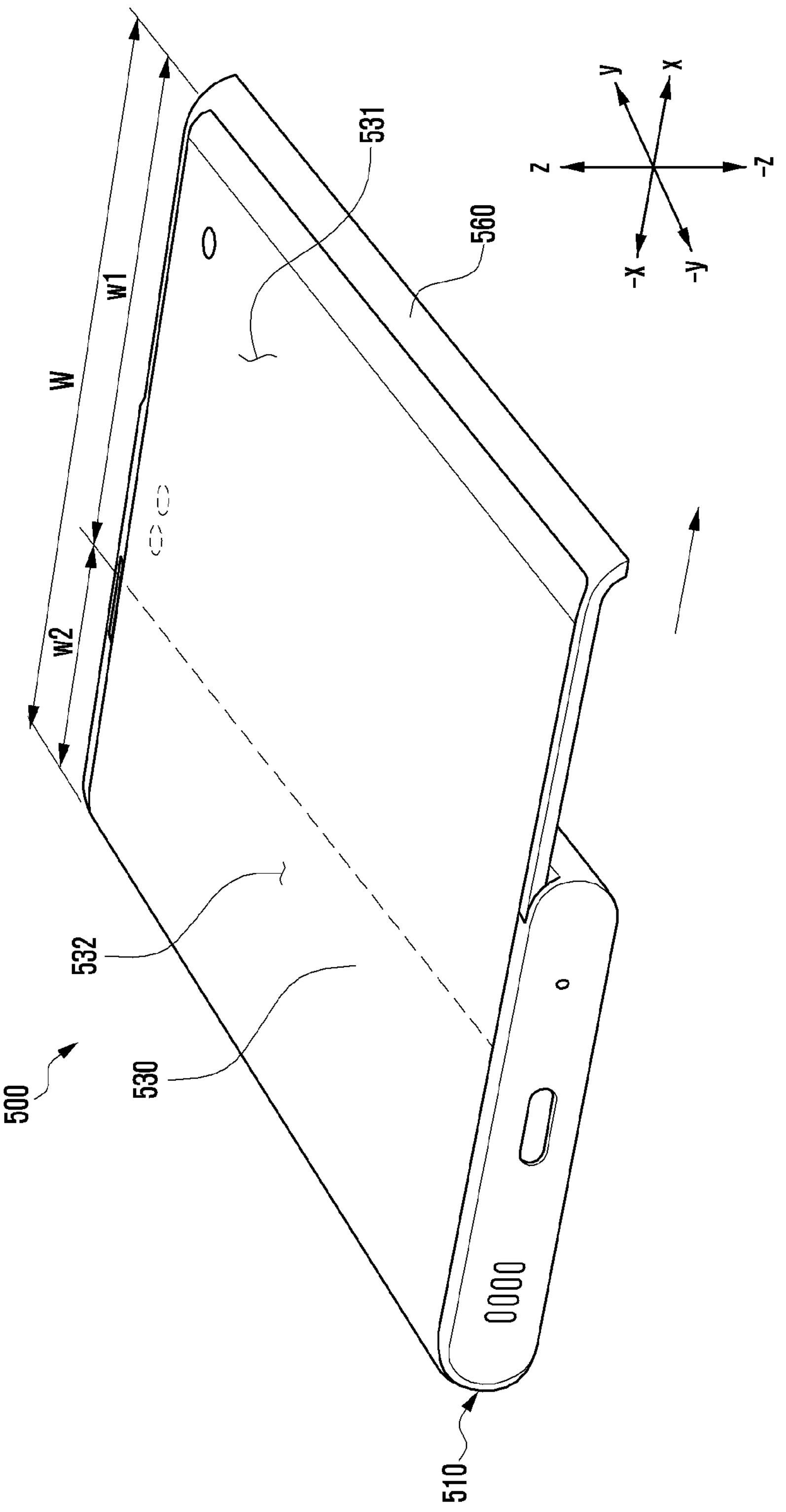
FIG. 6 is a front perspective view of an electronic device illustrating a second state according to an embodiment of the disclosure.

FIG. 6 is a front perspective view of an electronic device illustrating a second state according to an embodiment of the disclosure.

Figure 7:
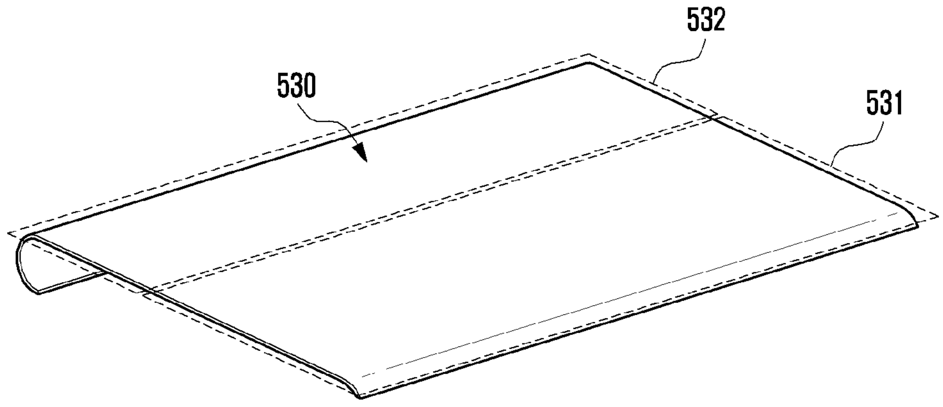
FIG. 7 is a perspective view illustrating a display of an electronic device according to an embodiment of the disclosure.

FIG. 7 is a perspective view illustrating a display of an electronic device according to an embodiment of the disclosure.

Referring to FIGS. 5 and 6, an electronic device 500 (e.g., the electronic device 101 of FIG. 1) according to various embodiments may be at least partially similar to the electronic device 101 of FIG. 1, or an electronic device 500 may further include other embodiments.

Referring to FIGS. 5 and 6, an electronic device 500 according to various embodiments may include a housing 510 and a slide plate 560 coupled to the housing 510 to be at least partially movable from the housing 510. According to an embodiment, the slide plate 560, as a member corresponding to at least a portion of the housing 510, may perform a role of supporting the display 530 while slide-moving. For example, at least a portion of the slide plate 560 is disposed in a state of being slid into the inner space of the housing 510 in the first state of the electronic device 500. For example, at least a portion of the slide plate 560 is disposed in a state of sliding out from the inner space of the housing 510 in the second state of the electronic device 500. The slide plate 560 may serve to support at least a portion of the display 530, for example, the second area 531 of the display 530 in the second state of the electronic device 500.

In yet another embodiment, the electronic device 500 may form a third state (e.g., an intermediate state) between the first state and the second state. For example, the third state may be referred to as a third shape, and the third shape may include a free stop state.

Referring to FIGS. 5 to 7, the display 530 according to an embodiment may be a flexible display.

According to yet another embodiment, the display 530 may be divided into a first area 532 and a second area 531.

The first area 532 of the display 530 may slide out from the inner space of the housing 510 in association with the movement of at least a portion of the housing 510 (e.g., the slide plate 560) in a first direction (e.g., the x direction of FIG. 5), and this state may be defined as the second state of the electronic device 500.

The first area 532 of the display 530 may slide into the inner space of the housing 510 in association with the movement of at least a portion of the housing 510 (e.g., the slide plate 560) in a second direction (e.g., the −x direction of FIG. 5) opposite to the first direction (e.g., the x direction of FIG. 5), and this state may be defined as the first state of the electronic device 500. For example, the first area 532 of the display 530 is visually exposed to the outside variably according to the movement of the housing 510. According to various embodiments, the electronic device 500 may deactivate the first area 532 of the display 530 while in the second state. For example, the electronic device 500 controls the first area 532 of the display 530 to be in an off state while in the second state. In some embodiments, the electronic device 500 may display a compensation image for reducing a luminance deviation of the first area 532 of the display 530 while in the second state.

According to various embodiments, in the first state of the electronic device 500, the display 530 may have a first width w1 as the first area 532 slides into the inner space of the housing 510.

According to various embodiments, in the second state of the electronic device 500, the display 530 may increase by the second width w2 corresponding to the width of the first area 532 as the first area 532 slides out of the inner space of the housing 510. Accordingly, the total width W of the display 530 visually displayed in the second state of the electronic device 500 may have the sum of the first width w1 and the second width w2.

Figure 8:
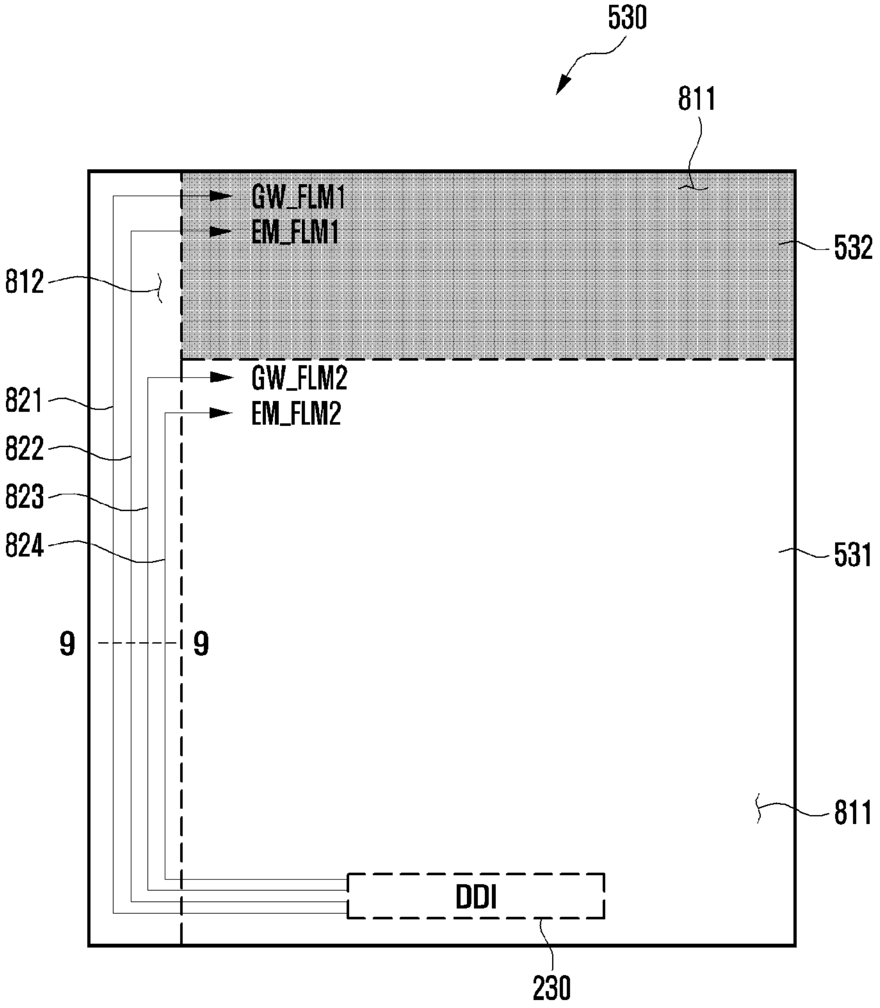
FIG. 8 is a plane view schematically illustrating a display according to an embodiment of the disclosure.

FIG. 8 is a plane view schematically illustrating a display according to an embodiment of the disclosure.

Figure 9:
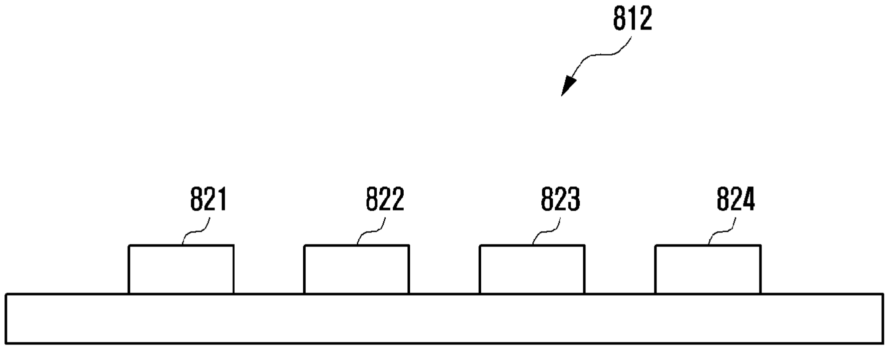
FIG. 9 is a cross-sectional view of a display according to an embodiment shown in FIG. 8 taken along line 9-9 according to an embodiment of the disclosure.

FIG. 9 is a cross-sectional view of the display shown in FIG. 8 taken along line 9-9 according to an embodiment of the disclosure.

Referring to FIGS. 8 and 9, the display 530 according to an embodiment may include a display area 811 and a non-display area 812, and the non-display area 812 may be disposed to be adjacent to at least a portion of boundary area.

According to an embodiment, the display area 811 may be divided into a first area 532 in which the first pixels (e.g., the first pixels P1 of FIG. 3) are disposed, and a second area 531 in which the second pixels (e.g., the second pixels P2 of FIG. 3) are disposed. According to another embodiment, as described above with reference to FIGS. 5 to 7, the first area 532 may be an area that is variably visually exposed to the outside according to the movement of the housing 510. According to yet another embodiment, as described above with reference to FIGS. 5 to 7, the second area 531 may be an area that is visually exposed in a fixed manner regardless of the movement of the housing 510.

According to yet another embodiment, a gate controller 330 (e.g., the gate controller 330 of FIG. 3) may be disposed in the non-display area 812. The gate controller 330 may include gate driving circuits (e.g., a first scan driving circuit SD1, a second scan driving circuit SD2, a first light emission driving circuit EMD1, and a second light emission driving circuit EMD2 of FIG. 10) to supply the gate signal and the light emission signal EM to the first pixels P1 and the second pixels P2 disposed in the display area 811.

According to yet another embodiment, the gate controller 330 may supply the gate signal and the light emission signal EM to the first pixels P1 and the second pixels P2 of the display area 811 through the gate line (e.g., the gate line GL of FIG. 3) by receiving a start signal from the DDI 230 and responding to the input start signal.

According to yet another embodiment, a plurality of start signal lines 821, 822, 823, and 824 may be disposed as transmission lines for supplying the start signal output from the DDI 230 to the gate controller 330 in the non-display area 812.

According to yet another embodiment, the start signal may include a first GW start signal GW_FLM1 for triggering an operation of the first gate controller corresponding to the first area 532, and the first GW start signal GW_FLM1 may be supplied to the first gate controller corresponding to the first area 532 through the first GW start signal line 821.

According to yet another embodiment, the start signal may include a first EM start signal EM_FLM1 for triggering an operation of the first light emission controller corresponding to the first area 532, and the first EM start signal EM_FLM1 may be supplied to the first emission control unit corresponding to the first area 532 through the first EM start signal line 822.

According to yet another embodiment, the start signal may include a second GW start signal GW_FLM2 for triggering an operation of the second gate controller corresponding to the second area 531, and the second GW start signal GW_FLM2 may be supplied to the second gate controller corresponding to the second area 531 through the second GW start signal line 823.

According to yet another embodiment, the start signal may include a second EM start signal EM_FLM2 for triggering an operation of the second light emission controller corresponding to the second area 531, and the second EM start signal EM_FLM2 may be supplied to the second light emission controller corresponding to the second area 531 through the second EM start signal line 824.

Referring to FIGS. 8 and 9, a plurality of start signal lines 821, 822, 823, and 824 according to various embodiments may be spaced apart in the non-display area 812. For example, in the non-display area 812, a first GW start signal line 821, a first EM start signal line 822, a second GW start signal line 823, and a second EM start signal line 824 are spaced apart.

Figure 10:
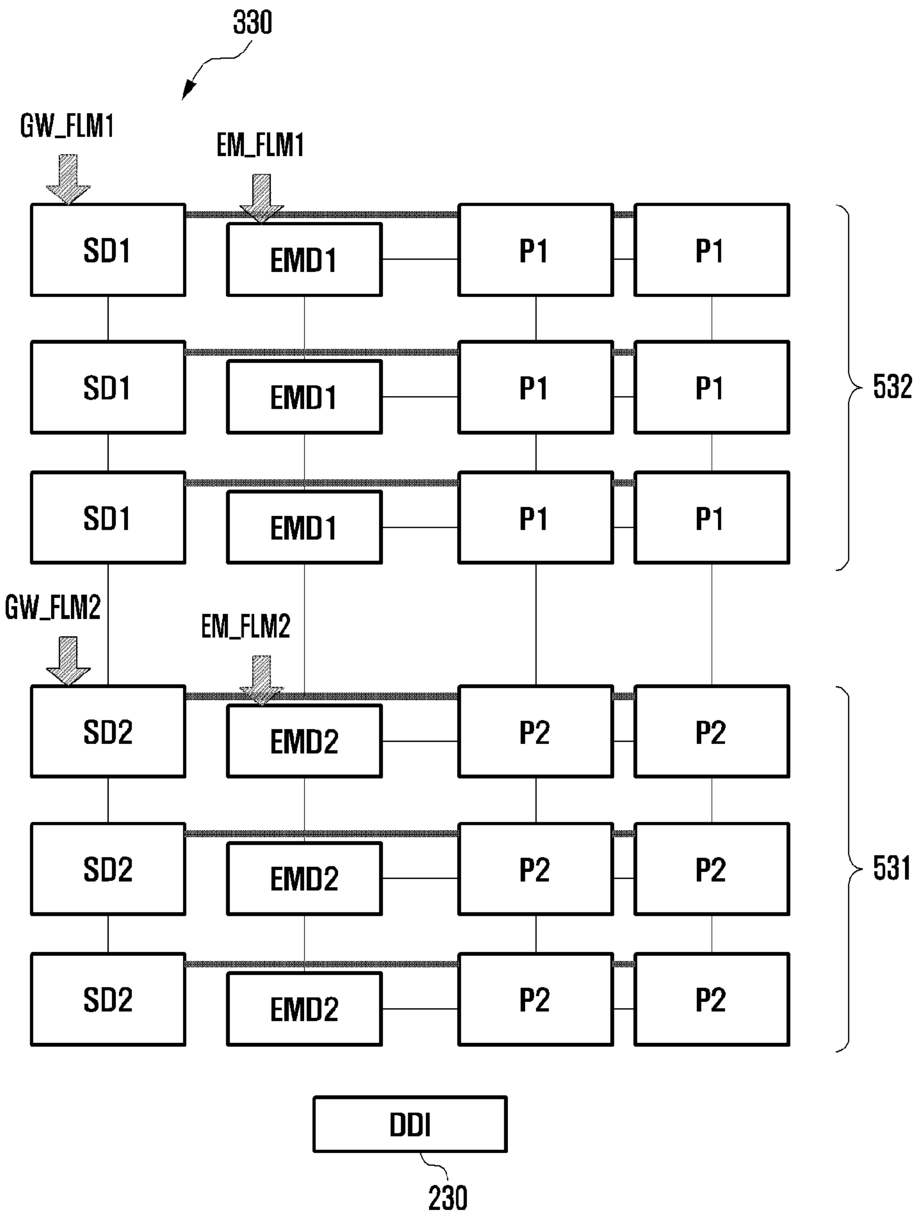
FIG. 10 is a block diagram illustrating a gate controller of a display according to an embodiment of the disclosure.

FIG. 10 is a block diagram illustrating a gate controller of a display 530 according to an embodiment of the disclosure.

Referring to FIG. 10, a gate controller 330 of the display 530 according to an embodiment may include a first gate controller to supply at least one gate signal to the first pixels P1 disposed in the first area 532 of the display 530, and a first emission controller to supply the light emission signal EM to the first pixels P1.

According to an embodiment, the first gate controller may include a first scan driving circuit SD1. The first scan driving circuit SD1 may generate a first gate signal GW (e.g., the first gate signal GW of FIG. 11), a second gate signal GW_O (e.g., the second gate signal GW_O of FIG. 11), a third gate signal G1_O (e.g., the third gate signal G1_O of FIG. 11), and the fourth gate signal GB (e.g., the fourth gate signal GB of FIG. 11) in response to the first GW start signal GW_FLM1, and the generated first to fourth gate signals GW, GW_O, GI_O, and GB may be sequentially supplied to the first pixels P1 through a gate line (e.g., the gate line GL of FIG. 3).

According to another embodiment, the first light emission controller may include a first light emission driving circuit EMD1. The first light emission driving circuit EMD1 may generate a light emission signal EM (e.g., the light emission signal EM of FIG. 11) in response to the first EM start signal EM_FLM1, and the generated light emission signal EM may be sequentially supplied to the first pixels P1 through a light emission signal line (not shown).

The gate controller 330 of the display 530 according to yet another embodiment may further include a second gate controller for supplying at least one gate signal to the second pixels P2 disposed in the second area 531 of the display 530 and a second light emission controller for supplying the light emission signal EM to the second pixels P2.

According to yet another embodiment, the second gate controller may include a second scan driving circuit SD2. The second scan driving circuit SD2 may generate a first gate signal GW, a second gate signal GW_O, a third gate signal G1_O, and a fourth gate signal GB in response to the second GW start signal GW_FLM2, and the generated first to fourth gate signals GW, GW_O, G1_O, and GB may be sequentially supplied to the second pixels P2 through the gate line GL.

According to yet another embodiment, the second light emission controller may include a second light emission driving circuit EMD2. The second light emission driving circuit EMD2 may generate a light emission signal EM in response to the first EM start signal EM_FLM1, and the generated light emission signal EM may be sequentially supplied to the second pixels P2 through a light emission signal line (not shown).

Figure 11:
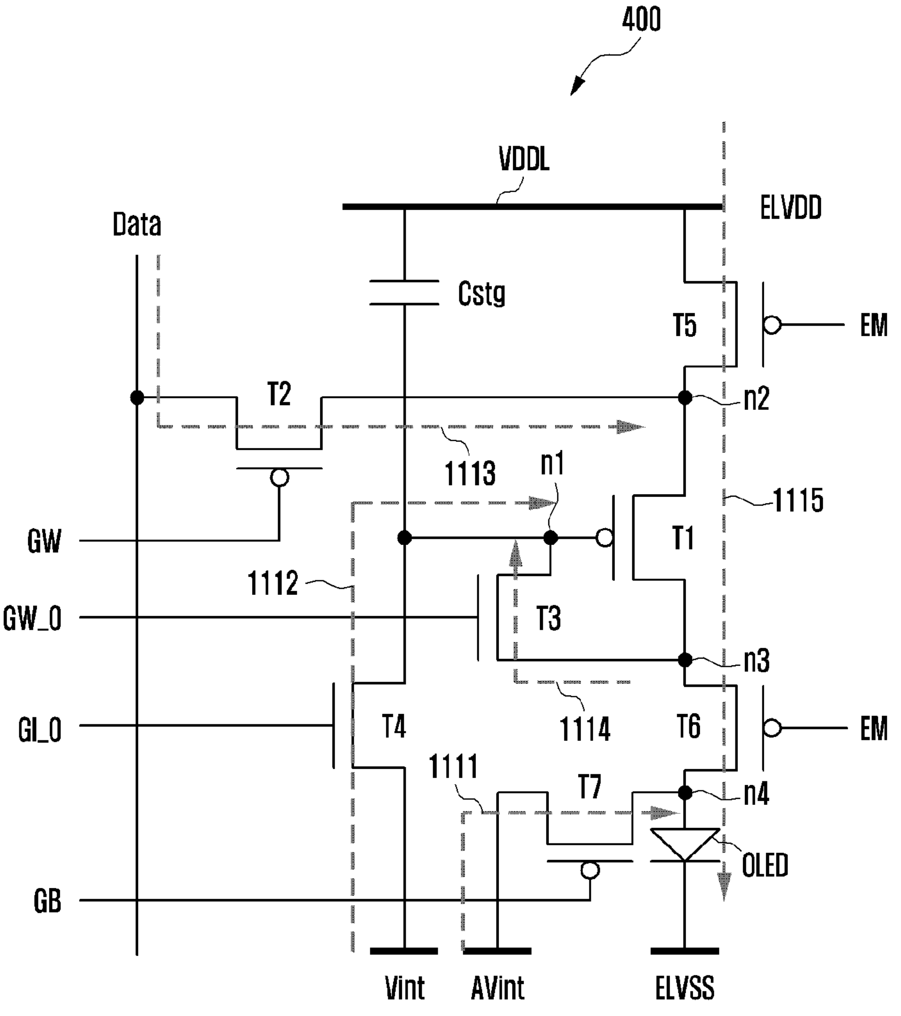
FIG. 11 is a circuit diagram illustrating an operation of a pixel driving circuit for driving a second pixel while an electronic device is in a first state according to an embodiment of the disclosure.

FIG. 11 is a circuit diagram illustrating an operation of a pixel driving circuit for driving a second pixel P2 while an electronic device is in a first state according to an embodiment of the disclosure.

Figure 12:
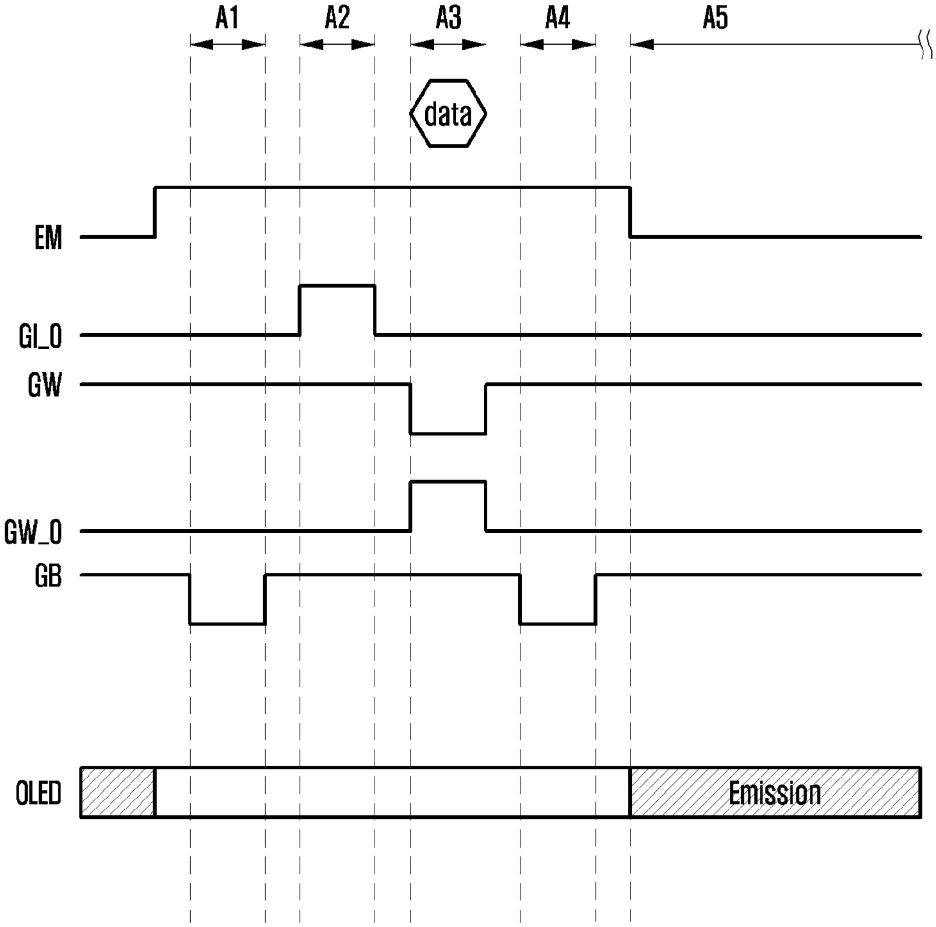
FIG. 12 is a waveform diagram illustrating a gate signal and a light emission signal supplied to a pixel driving circuit for driving a second pixel while an electronic device is in a first state according to an embodiment of the disclosure.

FIG. 12 is a waveform diagram illustrating a gate signal and a light emission signal EM supplied to a pixel driving circuit for driving a second pixel P2 while an electronic device is in a first state according to an embodiment of the disclosure.

Referring to FIGS. 11 and 12, the electronic device 500 according to an embodiment may deactivate the first pixels P1 and activate only the second pixel P2 in the first state. According to another embodiment, in the first state, as described above with reference to FIG. 5, the first area 532 of the display 530 may slide into the inner space of the housing 510 not to be visually visible and only the second area 531 may be in a state that is visually visible from the outside of the electronic device 500, and the electronic device 500 may control as a "partial display state" that deactivates the first pixels P1 of the display 530 and activates only the second pixels P2 while in the first state.

According to another embodiment, while the display 530 (or the display panel 310 of FIG. 3) is controlled to be in a partial display state, the electronic device 500 may drive the second pixels P2 by dividing each frame to periods A1, A2, A3, A4 and A5.

Referring to the period A1 of FIGS. 11 and 12, the electronic device 500 may turn on the seventh TFT T7 of the second pixel P2 by supplying the fourth gate signal GB to the second pixel P2. For example, in the second pixel P2 during the A1 period, only the seventh TFT T7 among the first to seventh TFTs T1, T2, T3, T4, T5, T6, and T7 may be turned on, and the remaining TFTs may be turned off. In the period A1, the second pixel P2, as shown by arrow 1111 in FIG. 11, may initialize the anode (i.e., the fourth node n4) of the OLED to the second initialization voltage Avint as the seventh TFT T7 is turned on.

Referring to the period A2 of FIGS. 11 and 12, the electronic device 500 may turn on the fourth TFT T4 of the second pixel P2 by supplying the third gate signal G1_O to the second pixel P2. For example, in the second pixel P2 during the A2 period, only the fourth TFT T4 among the first to seventh TFTs T1, T2, T3, T4, T5, T6, and T7 may be turned on, and the remaining TFTs may be turned off. In the period A2, the second pixel P2, as shown by arrow 1112 in FIG. 11, may initialize the gate (i.e., the first node n1) of the first TFT T1 (e.g., the driving TFT) to the first initialization voltage Vint as the fourth TFT T4 is turned on.

Referring to the period A3 of FIGS. 11 and 12, the electronic device 500 may turn on the second TFT T2 and the third TFT T3 of the second pixel P2 by supplying the first gate signal GW and the second gate signal GW_O to the second pixel P2. For example, in the second pixel P2 during the A3 period, only the second TFT T2 and the third TFT T3 among the first to seventh TFTs T1, T2, T3, T4, T5, T6, and T7 may be turned on, and the remaining TFTs may be turned off. In the period A3, the second pixel P2, as shown by the arrow 1113 in FIG. 11, may input the data voltage Data to the source (i.e., the second node n2) of the first TFT T1 as the second TFT T2 is turned on. In the period A3, the second pixel P2, as shown by the arrow 1114 in FIG. 11, may diode-connect the drain (i.e., the third node n3) of the first TFT T1 and the gate (i.e., the first node n1) of the TFT T1 as the third TFT T3 is turned on. In the second pixel P2, as the first TFT T1 is diode-connected, a voltage (e.g., Vdata+Vth) corresponding to the sum of the threshold voltage Vth and the data voltage Data (e.g., Vdata) of the first TFT T1 may be stored in the gate (i.e., the first node n1) of the first TFT T1. In this case, the voltage (e.g., Vdata+Vth) stored in the gate (i.e., the first node n1) of the first TFT T1 may be maintained for one frame period by the storage capacitor Cstg.

Referring to the period A4 of FIGS. 11 and 12, the electronic device 500 may turn on the seventh TFT T7 of the second pixel P2 by supplying the fourth gate signal GB to the second pixel P2. For example, in the second pixel P2 during the A4 period, only the seventh TFT T7 among the first to seventh TFTs T1, T2, T3, T4, T5, T6, and T7 may be turned on, and the remaining TFTs may be turned off. In the period A4, the second pixel P2, as shown by the arrow 1111 in FIG. 11, may initialize the anode (i.e., the fourth node n4) of the OLED to the second initialization voltage Avint as the seventh TFT T7 is turned on. According to various embodiments, the electronic device 500 may omit the operation according to the A4 period.

Referring to the period A5 of FIGS. 11 and 12, the electronic device 500 may turn on the fifth TFT T5 and the sixth TFT T6 of the second pixel P2 by supplying the light emission signal EM to the second pixel P2. For example, in the second pixel P2 during the A5 period, only the first TFT T1, the fifth TFT T5 and the sixth TFT T6 among the first to seventh TFTs T1, T2, T3, T4, T5, T6, and T7 are turned on, and the remaining TFTs may be turned off. In second pixel P2 during the period A5, as shown by the arrow 1115 in FIG. 11, the ELVDD voltage may be applied to the source (i.e., the second node n2) of the first TFT T1 as the fifth TFT T5 is turned on and the first TFT T1 may supply the driving current corresponding to the data voltage Data to the OLED through the turned-on sixth TFT T6. For example, in the period A5, the difference value (e.g., Vgs) between the gate voltage (Vdata+Vth) and the source voltage (ELVDD) of the first TFT T1 becomes "Vdata+Vth-ELVDD", and the first TFT T1 may supply the driving current to the OLED based on that value. During the period A5, the OLED may display a designated grayscale corresponding to the data voltage Data based on the driving current input through the sixth TFT T6.

Figure 13:
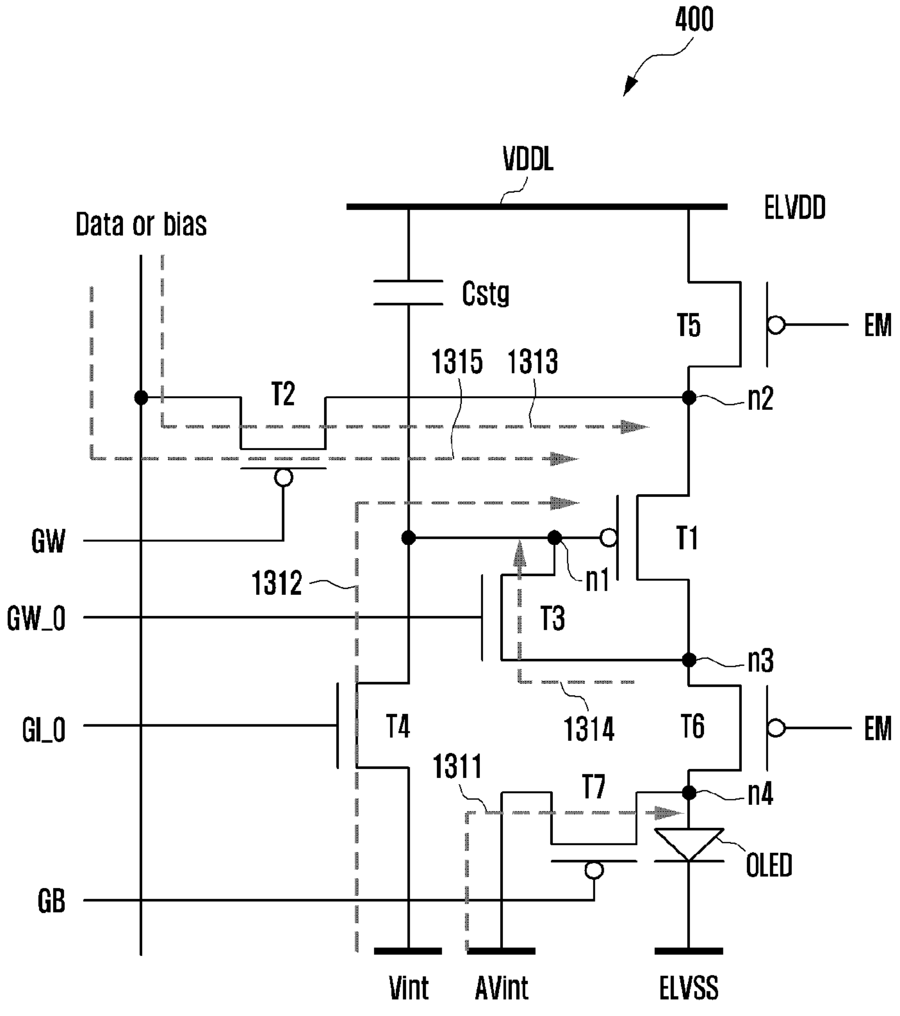
FIG. 13 is a circuit diagram illustrating an operation of a pixel driving circuit for driving a first pixel while an electronic device is in a first state according to an embodiment of the disclosure.

FIG. 13 is a circuit diagram illustrating an operation of a pixel driving circuit for driving a first pixel P1 while an electronic device is in a first state according to an embodiment of the disclosure.

Figure 14:
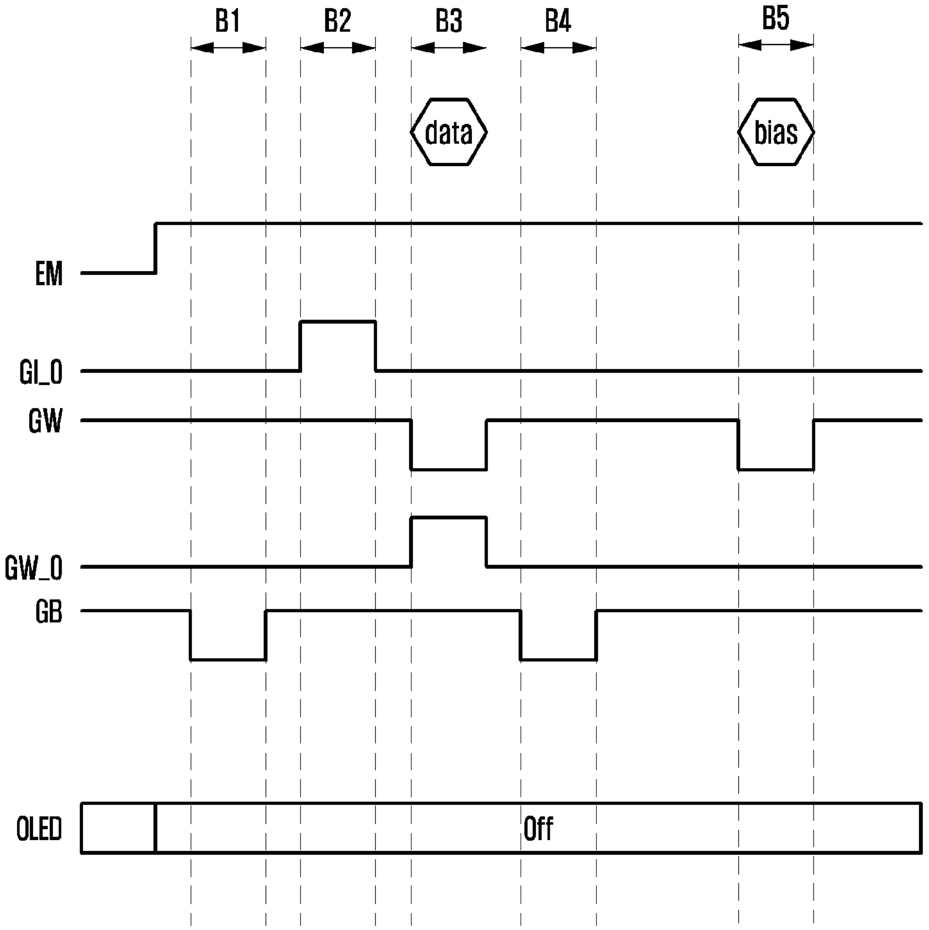
FIG. 14 is a waveform diagram illustrating a gate signal and a light emission signal supplied to a pixel driving circuit for driving a first pixel while an electronic device is in a first state according to an embodiment of the disclosure.

FIG. 14 is a waveform diagram illustrating a gate signal and a light emission signal EM supplied to a pixel driving circuit for driving a first pixel P1 while an electronic device is in a first state according to an embodiment of the disclosure.

Referring to FIGS. 13 and 14, the electronic device 500 according to an embodiment may deactivate the first pixels P1 and activate only the second pixel P2 in the first state. According to an embodiment, in the first state, as described above with reference to FIG. 5, the first area 532 of the display 530 may slide into the inner space of the housing 510 not to be visually visible and only the second area 531 may be in a state that is visually visible from the outside of the electronic device 500, and the electronic device 500 may control as a "partial display state" that deactivates the first pixels P1 of the display 530 and activates only the second pixels P2 while in the first state.

According to another embodiment, the electronic device 500 may drive the first pixels P1 by dividing each frame into the first sub-period and a second sub-period while the display 530 (or the display panel 310 of FIG. 3) is controlled to be in a partial display state.

According to yet another embodiment, the electronic device 500 may drive the first pixels P1 by dividing the first sub-period into periods B1, B2, B3, and B4 and drive the first pixels P1 by configuring the second sub-period as a B5 period that is after the B4 period. For example, periods B1, B2, B3, and B4 of FIG. 14 are defined as a first sub-period, and period B5 of FIG. 14 may be defined as a second sub-period.

Referring to the period B1 of FIGS. 13 and 14, the electronic device 500 may turn on the seventh TFT T7 of the second pixel P2 by supplying the fourth gate signal GB to the first pixel P1. For example, in the second pixel P2 during the B1 period, only the seventh TFT T7 among the first to seventh TFTs T1, T2, T3, T4, T5, T6, and T7 are turned on, and the remaining TFTs are turned off. In the period B1, the first pixel P1, as shown by arrow 1311 in FIG. 13, may initialize the anode (i.e., the fourth node n4) of the OLED to the second initialization voltage AVint as the seventh TFT T7 is turned on.

Referring to the period B2 of FIGS. 13 and 14, the electronic device 500 may turn on the fourth TFT T4 of the first pixel P1 by supplying the third gate signal G1_O to the first pixel P1. For example, in the first pixel P1 during the B2 period, only the fourth TFT T4 among the first to seventh TFTs T1, T2, T3, T4, T5, T6, and T7 may be turned on, and the remaining TFTs may be turned off. In the period B2, the first pixel P1, as shown by arrow 1312 in FIG. 13, may initialize the gate (i.e., the first node n1) of the first TFT T1 (e.g., the driving TFT) to the first initialization voltage Vint as the fourth TFT T4 is turned on.

Referring to the period B3 of FIGS. 13 and 14, the electronic device 500 may turn on the second TFT T2 and the third TFT T3 of the first pixel P1 by supplying the first gate signal GW and the second gate signal GW_O to the first pixel P1. For example, in the first pixel P1 during the B3 period, only the second TFT T2 and the third TFT T3 among the first to seventh TFTs T1, T2, T3, T4, T5, T6, and T7 may be turned on, and the remaining TFTs may be turned off. In the period B3, the first pixel P1, as shown by the arrow 1315 in FIG. 13, may input the data voltage Data to the source (i.e., the second node n2) of the first TFT T1 as the second TFT T2 is turned on. In yet another embodiment, the data voltage Data corresponding to the inactive state may be, for example, a data voltage Data corresponding to 0 grayscale. In another embodiment, the data voltage Data corresponding to the inactive state may be a voltage corresponding to the designated grayscale that corresponds to the compensation image as a voltage for displaying a compensation image for reducing the luminance deviation of the first area 532 of the display 530. In the period B3, the first pixel P1, as shown by the arrow 1314 in FIG. 13, may diode-connect the drain (i.e., the third node n3) of the first TFT T1 and the gate (i.e., the first node n1) of the TFT T1 as the third TFT T3 is turned on. In the first pixel P1, as the first TFT T1 is diode-connected, a voltage (e.g., Vdata+Vth) corresponding to the sum of the threshold voltage Vth and the data voltage Data (e.g., Vdata) of the first TFT T1 may be stored in the gate (i.e., the first node n1) of the first TFT T1. In this case, the voltage (e.g., Vdata+Vth) stored in the gate (i.e., the first node n1) of the first TFT T1 may be maintained for one frame period by the storage capacitor Cstg.

Referring to the period B4 of FIGS. 13 and 14, the electronic device 500 may turn on the seventh TFT T7 of the first pixel P1 by supplying the fourth gate signal GB to the first pixel P1. For example, in the first pixel P1 during the B4 period, only the seventh TFT T7 among the first to seventh TFTs T1, T2, T3, T4, T5, T6, and T7 may be turned on, and the remaining TFTs may be turned off. In the period B4, the first pixel P1, as shown by the arrow 1311 in FIG. 13, may initialize the anode (i.e., the fourth node n4) of the OLED to the second initialization voltage AVint as the seventh TFT T7 is turned on. According to various embodiments, the electronic device 500 may omit the operation according to the B4 period.

Referring to the period B5 of FIGS. 13 and 14, the electronic device 500 may turn on the second TFT T2 of the first pixel P1 by supplying the first gate signal GW to the first pixel P1. For example, in the first pixel P1 during the B5 period, only the second TFT T2 among the first to seventh TFTs T1, T2, T3, T4, T5, T6, and T7 may be turned on, and the remaining TFTs may be turned off. The first pixel P1 during the period B5, as shown by the arrow 1313 in FIG. 13, may receive the bias voltage bias from the data line DL. The bias voltage may be input to the source (i.e., the second node n2) of the first TFT T1 through the second TFT T2. Accordingly, the first TFT T1 may maintain the bias state in which the difference between the gate voltage Vdata+Vth and the source voltage ELVDD) of the first TFT T1 (e.g., Vgs) becomes "Vdata+Vth−Vbias (e.g., Vdata+Vth-ELVDD)".

According to yet another embodiment, the electronic device 500 may not provide the light emission signal EM to the first pixel P1 while the display 530 (or the display panel 310 of FIG. 3) is controlled to be in a partial display state. Accordingly, according to yet another embodiment, the electronic device 500 may turn off the fifth TFT T5 and the sixth TFT T6 of the first pixel P1 and the OLED may not emit light while the display 530 (or the display panel 310 of FIG. 3) is controlled to be in a partial display state.

The electronic device 500 according to various embodiments may reduce the deviation of the features (e.g., luminance, color) of the first pixel P1 and the features (e.g., luminance, color) of the second pixel P2 and may reduce the afterimages even if the first pixel P1 is deactivated for a long time by having the driving TFT (i.e., the first TFT T1) of the deactivated pixel P1 maintain the bias state while the display 530 (or the display panel 310 of FIG. 3) is controlled to be in a partial display state.

Figure 15:
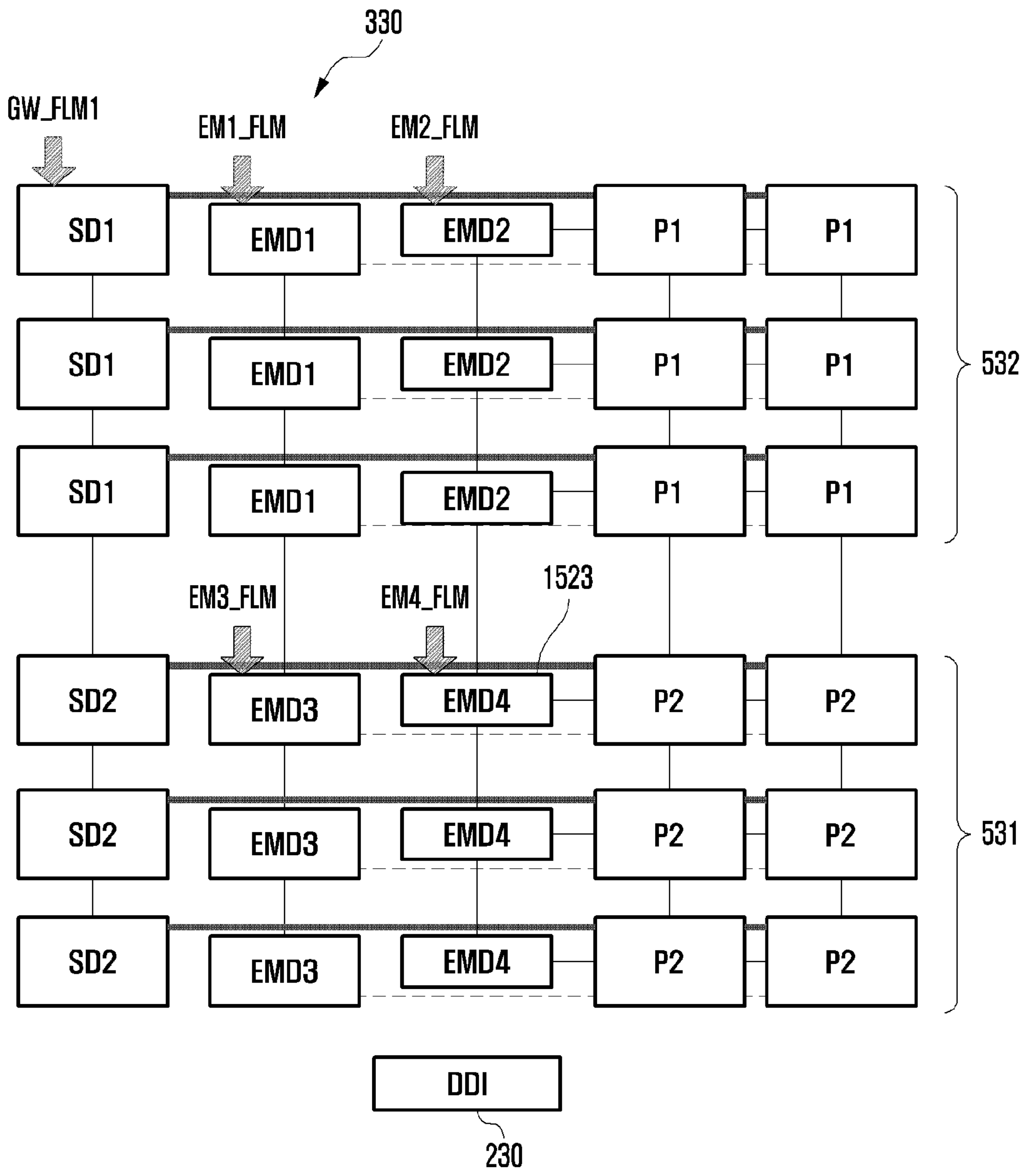
FIG. 15 is a block diagram illustrating a gate controller of a display according to an embodiment of the disclosure.

FIG. 15 is a block diagram illustrating a gate controller of a display according to an embodiment of the disclosure.

Referring to FIG. 15, the gate controller 330 of the display 530 according to another embodiment may generate two light emission signals to control independently the switching operation of the fifth TFT T5 and the switching operation of the sixth TFT T6 of the pixel driving circuit.

The gate controller 330 of the display 530 according to yet another embodiment may include a first gate controller for supplying at least one gate signal to the first pixels P1 disposed in the first area 532 of the display 530, a first light emission controller for supplying the first light emission signal EM1 to the first pixels P1, and a second light emission controller for supplying the second light emission signal EM2 to the first pixels P1. The first light emission signal EM1 may be a signal for controlling the switching of the fifth TFT T5 of the pixel driving circuit 400 included in each of the first pixels P1. The second light emission signal EM2 may be a signal for controlling the switching of the sixth TFT T6 of the pixel driving circuit 400 included in each of the first pixels P1.

According to yet another embodiment, the first gate controller may include a first scan driving circuit SD1. The first scan driving circuit SD1 may generate a first gate signal GW (e.g., the first gate signal GW of FIG. 11), a second gate signal GW_O (e.g., the second gate signal GW_O of FIG. 11), a third gate signal G1_O (e.g., the third gate signal G1_O of FIG. 11), and the fourth gate signal GB (e.g., the fourth gate signal GB of FIG. 11) in response to the first GW start signal GW_FLM1, and the generated first to fourth gate signals GW, GW_O, GI_O, and GB may be sequentially supplied to the first pixels P1 through a gate line (e.g., the gate line GL of FIG. 3).

According to yet another embodiment, the first light emission controller may include a first light emission driving circuit EMD1. The first light emission driving circuit EMD1 may generate a first light emission signal EM1 (e.g., the first light emission signal EM1 of FIG. 19) in response to the first EM start signal EM1_FLM, and the generated first light emission signal EM1 may be sequentially supplied to the first pixels P1 through the first light emission signal line (not shown).

According to yet another embodiment, the second light emission controller may include a second light emission driving circuit EMD2. The second light emission driving circuit EMD2 may generate a second light emission signal (e.g., the second light emission signal EM2 of FIG. 19) in response to the second EM start signal EM2_FLM, and the generated second light emission signal EM2 may be sequentially supplied to the first pixels P1 through the second light emission signal line (not shown).

The gate controller 330 of the display 530 according to another embodiment may include a second gate controller for supplying at least one gate signal to the second pixels P2 disposed in the second area 531 of the display 530, a third light emission controller for supplying the third light emission signal EM3 to the second pixels P2, and the fourth light emission controller for supplying the fourth light emission signal EM4 to the second pixels P2. The third light emission signal EM3 may be a signal for controlling the switching of the fifth TFT T5 of the pixel driving circuit 400 that is included in each of the second pixels P2. The fourth light emission signal EM4 may be a signal for controlling the switching of the sixth TFT T6 of the pixel driving circuit 400 that is included in each of the second pixels p2.

According to yet another embodiment, the second gate controller may include a second scan driving circuit SD2. The second scan driving circuit SD2 may supply sequentially the first to fourth gate signals GW, GW_O, GI_O, and GB to the second pixels P2 through the gate line GL after outputting sequentially the first to fourth gate signals GW, GW_O, GI_O, and GB from the first scan driving circuit SD1.

According to yet another embodiment, the third light emission controller may include a third light emission driving circuit EMD3. The third light emission driving circuit EMD3 may generate a third light emission signal EM3 (e.g., the light emission signal EM3 of FIG. 17) in response to the third EM start signal EM3_FLM, and the generated third light emission signal EM3 may be sequentially supplied to the second pixels P2 through the first light emission signal line (not shown).

According to yet another embodiment, the fourth light emission controller may include a fourth light emission driving circuit EMD4. The fourth light emission driving circuit EMD4 may generate a fourth light emission signal (e.g., the fourth light emission signal EM4 of FIG. 17) in response to the fourth EM start signal EM4_FML and sequentially supply the generated fourth light emission signal EM4 to the second pixels P2 through the fourth light emission signal line (not shown).

Figure 16:
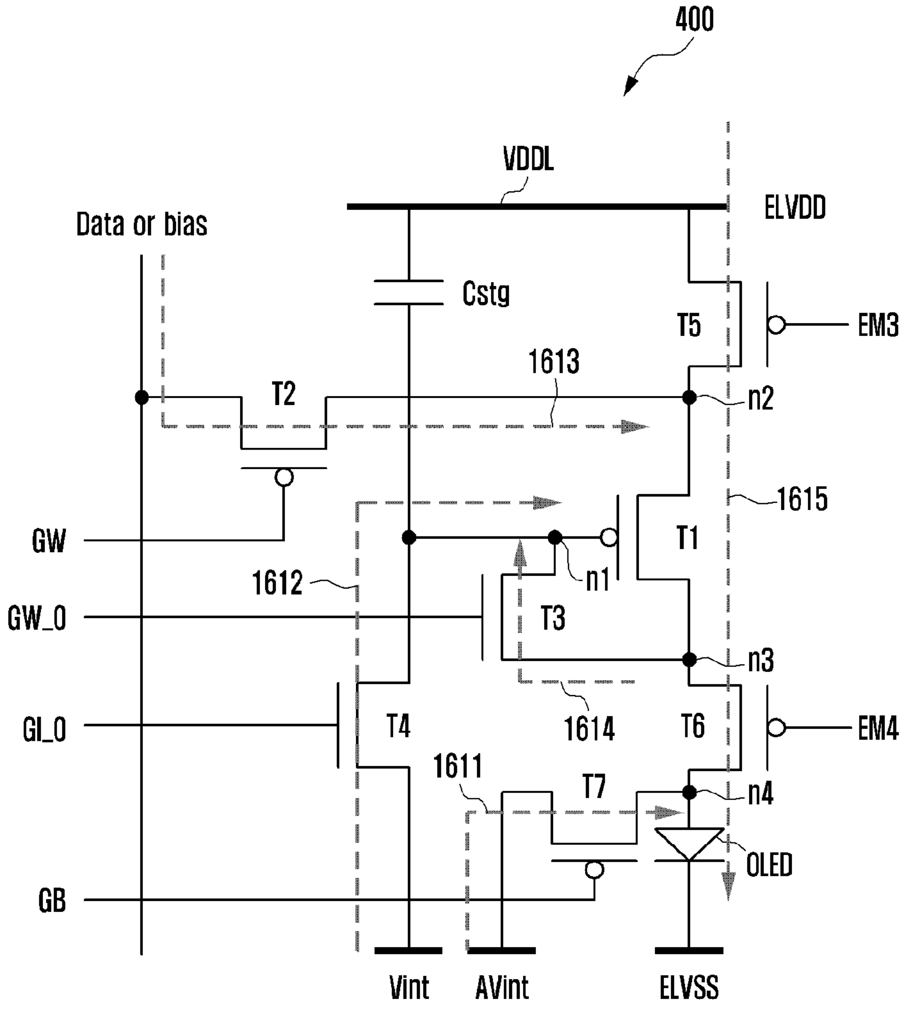
FIG. 16 is a circuit diagram illustrating an operation of a pixel driving circuit for driving a second pixel while an electronic device is in a first state according to an embodiment of the disclosure.

FIG. 16 is a circuit diagram illustrating an operation of a pixel driving circuit for driving a second pixel P2 while an electronic device is in a first state according to an embodiment of the disclosure.

Figure 17:
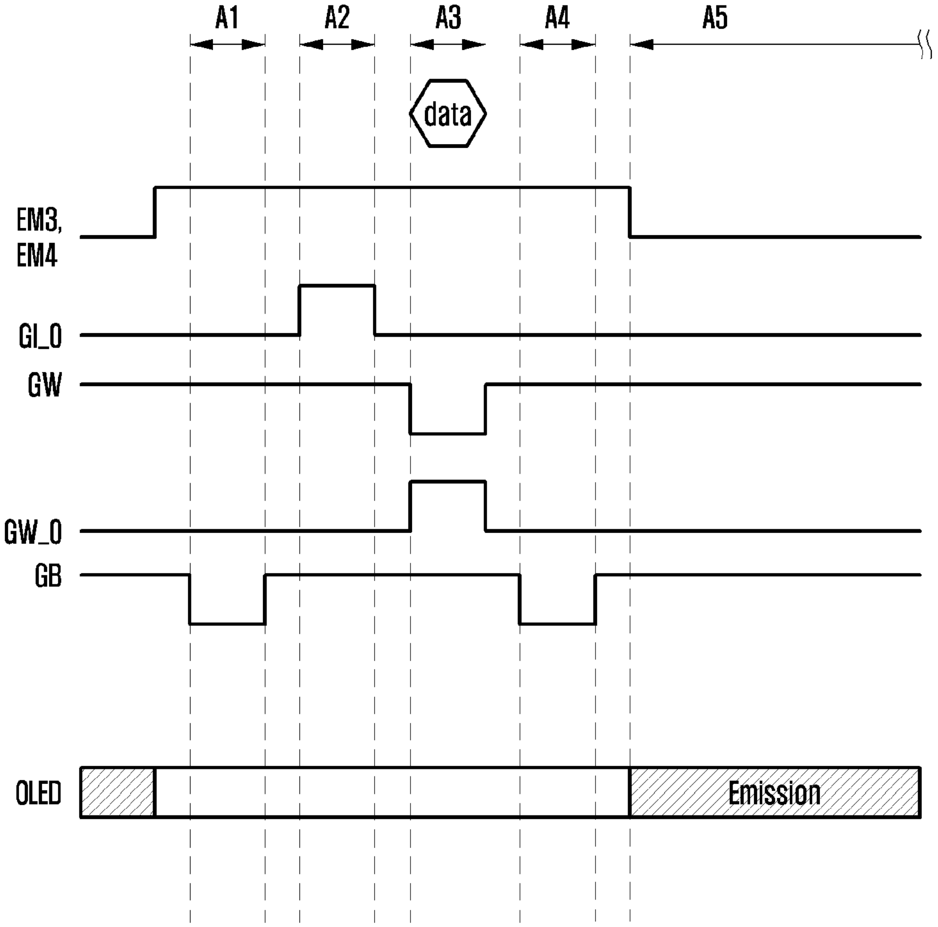
FIG. 17 is a waveform diagram illustrating a gate signal and a light emission signal supplied to a pixel driving circuit for driving a second pixel while an electronic device is in a first state according to an embodiment of the disclosure.

FIG. 17 is a waveform diagram illustrating a gate signal and a light emission signal supplied to a pixel driving circuit for driving a second pixel P2 while an electronic device is in a first state according to an embodiment of the disclosure.

Referring to FIGS. 16 and 17, the electronic device 500 according to an embodiment may deactivate the first pixels P1 and activate only the second pixel P2 in the first state. According to another embodiment, in the first state, as described above with reference to FIG. 5, the first area 532 of the display 530 may slide into the inner space of the housing 510 not to be visually visible and only the second area 531 may be in a state that is visually visible from the outside of the electronic device 500, and the electronic device 500 may control as a "partial display state" that deactivates the first pixels P1 of the display 530 and activates only the second pixels P2 while in the first state.

According to yet another embodiment, while the display 530 (or the display panel 310 of FIG. 3) is controlled to be in a partial display state, the electronic device 500 may drive the second pixels P2 by dividing each frame into periods A1, A2, A3, A4 and A5.

Referring to the period A1 of FIGS. 16 and 17, the electronic device 500 may turn on the seventh TFT T7 of the second pixel P2 by supplying the fourth gate signal GB to the second pixel P2. For example, in the second pixel P2 during the A1 period, only the seventh TFT T7 among the first to seventh TFTs T1, T2, T3, T4, T5, T6, and T7 may be turned on, and the remaining TFTs may be turned off. In the period A1, the second pixel P2, as shown by arrow 1611 in FIG. 16, may initialize the anode (i.e., the fourth node n4) of the OLED to the second initialization voltage AVint as the seventh TFT T7 is turned on.

Referring to the period A2 of FIGS. 16 and 17, the electronic device 500 may turn on the fourth TFT T4 of the second pixel P2 by supplying the third gate signal G1_O to the second pixel P2. For example, in the second pixel P2 during the A2 period, only the fourth TFT T4 among the first to seventh TFTs T1, T2, T3, T4, T5, T6, and T7 may be turned on, and the remaining TFTs may be turned off. In the period A2, the second pixel P2, as shown by arrow 1612 in FIG. 16, may initialize the gate (i.e., the first node n1) of the first TFT T1 (e.g., the driving TFT) to the first initialization voltage Vint as the fourth TFT T4 is turned on.

Referring to the period A3 of FIGS. 16 and 17, the electronic device 500 may turn on the second TFT T2 and the third TFT T3 of the second pixel P2 by supplying the first gate signal GW and the second gate signal GW_O to the second pixel P2. For example, in the second pixel P2 during the A3 period, only the second TFT T2 and the third TFT T3 among the first to seventh TFTs T1, T2, T3, T4, T5, T6, and T7 may be turned on, and the remaining TFTs may be turned off. In the period A3, the second pixel P2, as shown by the arrow 1613 in FIG. 16, may input the data voltage Data to the source (i.e., the second node n2) of the first TFT T1 as the second TFT T2 is turned on. In the period A3, the second pixel P2, as shown by the arrow 1614 in FIG. 16, may diode-connect the drain (i.e., the third node n3) of the first TFT T1 and the gate (i.e., the first node n1) of the TFT T1 as the third TFT T3 is turned on. In the second pixel P2, as the first TFT T1 is diode-connected, a voltage (e.g., Vdata+Vth) corresponding to the sum of the threshold voltage Vth and the data voltage Data (e.g., Vdata) of the first TFT T1 may be stored in the gate (i.e., the first node n1) of the first TFT T1. In this case, the voltage (e.g., Vdata+Vth) stored in the gate (i.e., the first node n1) of the first TFT T1 may be maintained for one frame period by the storage capacitor Cstg.

Referring to the period A4 of FIGS. 16 and 17, the electronic device 500 may turn on the seventh TFT T7 of the second pixel P2 by supplying the fourth gate signal GB to the second pixel P2. For example, in the second pixel P2 during the A4 period, only the seventh TFT T7 among the first to seventh TFTs T1, T2, T3, T4, T5, T6, and T7 may be turned on, and the remaining TFTs may be turned off. In the period A4, the second pixel P2, as shown by the arrow 1611 in FIG. 16, may initialize the anode (i.e., the fourth node n4) of the OLED to the second initialization voltage AVint as the seventh TFT T7 is turned on. According to various embodiments, the electronic device 500 may omit the operation according to the A4 period.

Referring to the period A5 of FIGS. 16 and 17, the electronic device 500 may turn on the fifth TFT T5 and the sixth TFT T6 of the second pixel P2 by supplying the third light emission signal EM3 and the fourth light emission signal EM4 to the second pixel P2. For example, in the second pixel P2 during the A5 period, only the first TFT T1, the fifth TFT T5 and the sixth TFT T6 among the first to seventh TFTs T1, T2, T3, T4, T5, T6, and T7 may be turned on, and the remaining TFTs may be turned off. In second pixel P2 during the period A5, as shown by the arrow 1615 in FIG. 16, the ELVDD voltage may be applied to the source (i.e., the second node n2) of the first TFT T1 as the fifth TFT T5 is turned on and the first TFT T1 may supply the driving current corresponding to the data voltage Data to the OLED through the turned-on sixth TFT T6. For example, in the period A5, the difference value (e.g., Vgs) between the gate voltage (Vdata+Vth) and the source voltage (ELVDD) of the first TFT T1 becomes "Vdata+Vth-ELVDD", and the first TFT T1 may supply the driving current to the OLED based on that value. During the period A5, the OLED may display a designated grayscale corresponding to the data voltage Data based on the driving current input through the sixth TFT T6.

Figure 18:
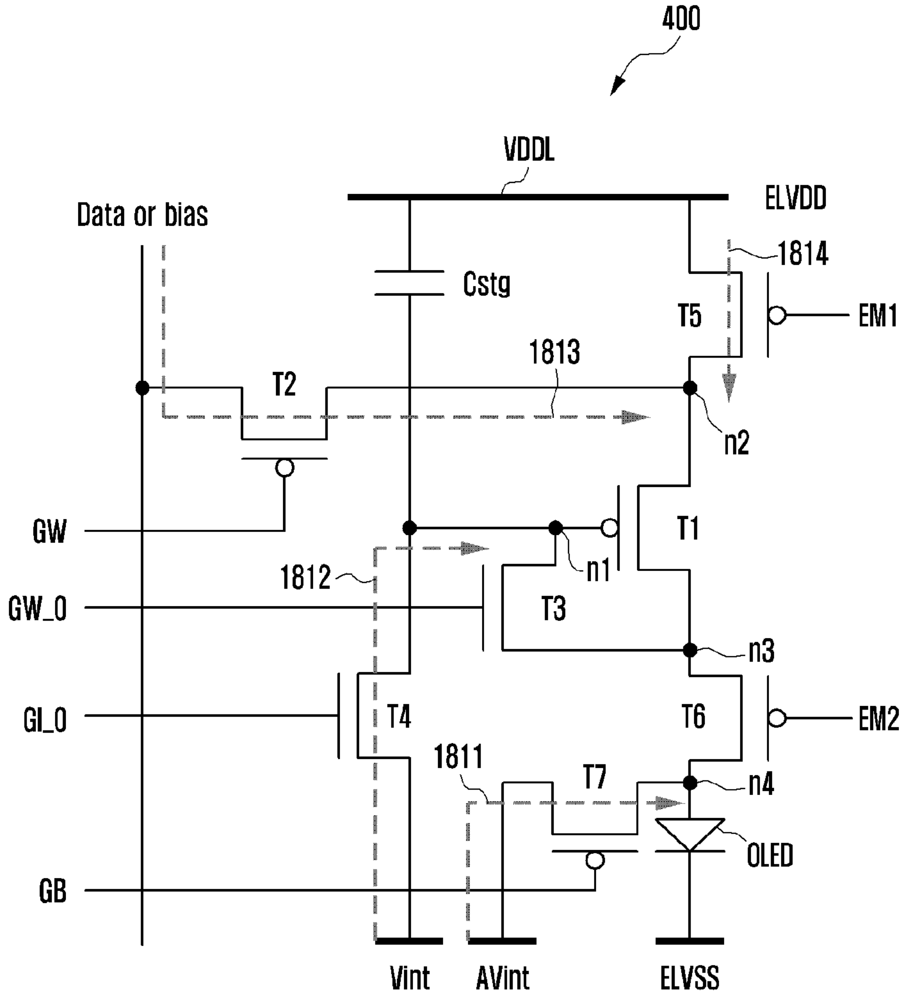
FIG. 18 is a circuit diagram illustrating an operation of a pixel driving circuit for driving a first pixel while an electronic device is in a first state according to an embodiment of the disclosure.

FIG. 18 is a circuit diagram illustrating an operation of a pixel driving circuit 400 for driving a first pixel P1 while an electronic device 500 is in a first state according to an embodiment of the disclosure.

Figure 19:
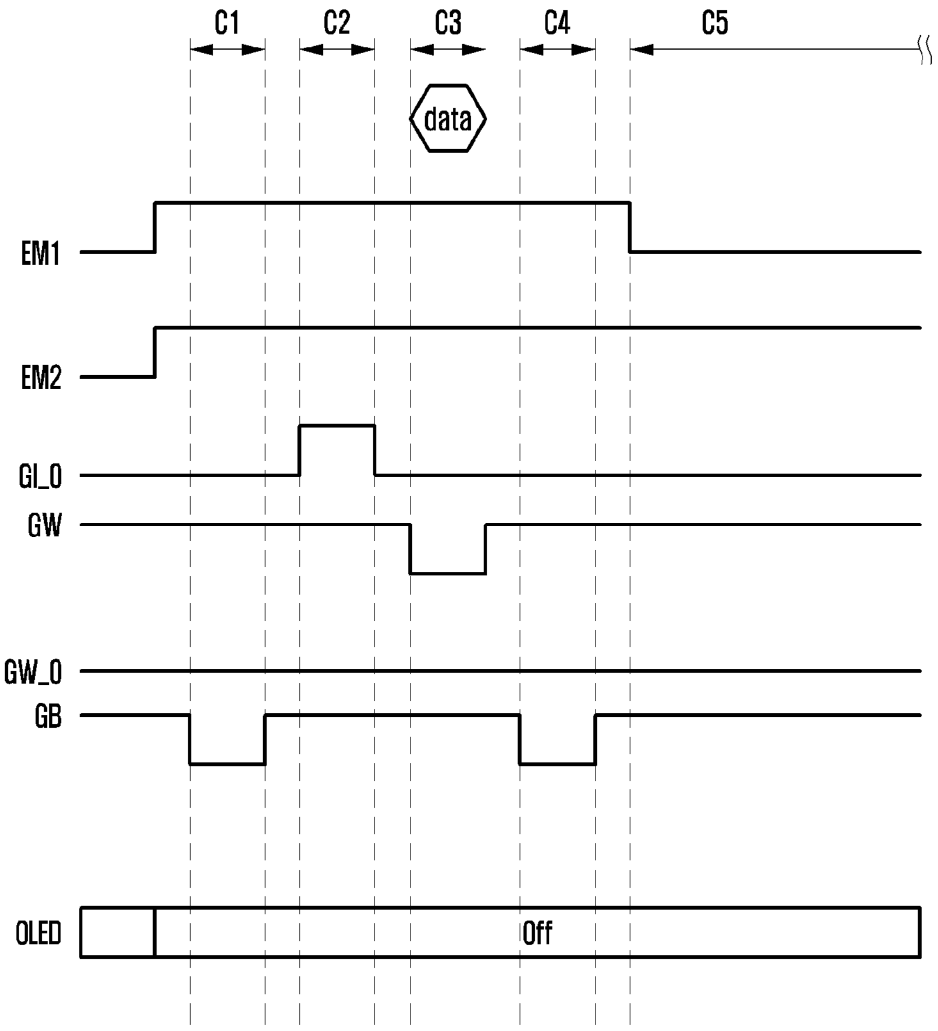
FIG. 19 is a waveform diagram illustrating a gate signal and a light emission signal supplied to a pixel driving circuit for driving a first pixel while an electronic device is in a first state according to an embodiment of the disclosure.

FIG. 19 is a waveform diagram illustrating a gate signal and a light emission signal supplied to a pixel driving circuit for driving a first pixel P1 while an electronic device 500 is in a first state according to an embodiment of the disclosure.

Referring to FIGS. 18 and 19, the electronic device 500 according to an embodiment may deactivate the first pixels P1 and activate only the second pixel P2 in the first state. According to yet another embodiment, in the first state, as described above with reference to FIG. 5, the first area 532 of the display 530 may slide into the inner space of the housing 510 not to be visually visible and only the second area 531 may be in a state that is visually visible from the outside of the electronic device 500, and the electronic device 500 may control as a "partial display state" that deactivates the first pixels P1 of the display 530 and activates only the second pixels P2 while in the first state.

According to yet another embodiment, the electronic device 500 may control the third TFT T3 of the first pixel P1 to maintain a turn-off state by not providing the second gate signal GW_O to the first pixel P1 while the display 530 (or the display panel 310 of FIG. 3) is controlled to be in a partial display state.

According to yet another embodiment, the electronic device 500 may drive the first pixels P1 by dividing each frame into a C1 period, a C2 period, a C3 period, a C4 period, and a C5 period while the display 530 (or the display panel 310 of FIG. 3) is controlled to be in a partial display state. According to various embodiments, the C1 period, the C2 period, the C3 period, the C4 period, and the C5 period shown in FIG. 19 may be substantially the same or similar to the A1 period, the A2 period, the A3 period, the A4 period, and A5 period shown in FIG. 17.

Referring to the period C1 of FIGS. 18 and 19, the electronic device 500 may turn on the seventh TFT T7 of the first pixel P1 by supplying the fourth gate signal GB to the first pixel P1. For example, in the first pixel P1 during the C1 period, only the seventh TFT T7 among the first to seventh TFTs T1, T2, T3, T4, T5, T6, and T7 may be turned on, and the remaining TFTs may be turned off. In the period C1, the first pixel P1, as shown by arrow 1811 in FIG. 18, may initialize the anode (i.e., the fourth node n4) of the OLED to the second initialization voltage AVint as the seventh TFT T7 is turned on.

Referring to the period C2 of FIGS. 18 and 19, the electronic device 500 may turn on the fourth TFT T4 of the first pixel P1 by supplying the third gate signal G1_O to the first pixel P1. For example, in the first pixel P1 during the C2 period, only the fourth TFT T4 among the first to seventh TFTs T1, T2, T3, T4, T5, T6, and T7 may be turned on, and the remaining TFTs may be turned off. In the period C2, the first pixel P1, as shown by arrow 1812 in FIG. 18, may initialize the gate (i.e., the first node n1) of the first TFT T1 (e.g., the driving TFT) to the first initialization voltage Vint as the fourth TFT T4 is turned on.

Referring to the period C3 of FIGS. 18 and 19, the electronic device 500 may turn on the second TFT T2 of the first pixel P1 by supplying the first gate signal GW to the first pixel P1. For example, in the first pixel P1 during the C3 period, only the second TFT T2 among the first to seventh TFTs T1, T2, T3, T4, T5, T6, and T7 may be turned on, and the remaining TFTs may be turned off. In the period C3, the first pixel P1, as shown by the arrow 1813 in FIG. 18, may input the data voltage Data to the source (i.e., the second node n2) of the first TFT T1 as the second TFT T2 is turned on. In yet another embodiment, the data voltage Data corresponding to the inactive state may be, for example, a data voltage Data corresponding to 0 grayscale. In yet another embodiment, the data voltage Data corresponding to the inactive state may be a voltage corresponding to the designated grayscale that corresponds to the compensation image as a voltage for displaying a compensation image for reducing the luminance deviation of the first area 532 of the display 530.

Referring to the period C4 of FIGS. 18 and 19, the electronic device 500 may turn on the seventh TFT T7 of the first pixel P1 by supplying the fourth gate signal GB to the first pixel P1. For example, in the first pixel P1 during the C4 period, only the seventh TFT T7 among the first to seventh TFTs T1, T2, T3, T4, T5, T6, and T7 may be turned on, and the remaining TFTs may be turned off. In the period C4, the first pixel P1, as shown by the arrow 1811 in FIG. 18, may initialize the anode (i.e., the fourth node n4) of the OLED to the second initialization voltage AVint as the seventh TFT T7 is turned on. According to various embodiments, the electronic device 500 may omit the operation according to the C4 period.

Referring to period C5 of FIGS. 18 and 19, the electronic device 500 may turn on the fifth TFT T5 of the first pixel P1 and turn off the sixth TFT T6 by supplying only the first light emission signal EM1 to the first pixel P1 among the first light emission signal EM1 and the second light emission signal EM2. In the first pixel P1 during the period C5, as shown by arrow 1814 in FIG. 18, the ELVDD voltage may be applied to the source of the first TFT T1 (i.e., the second node n2) as the fifth TFT T5 is turned on. Accordingly, in the C5 period, the first TFT T1 of the first pixel P1 may maintain a bias state in which the difference value (e.g. Vgs.) between the gate voltage (i.e., the first initialization voltage Vint) of the first TFT T1 and the source voltage ELVDD of the first TFT T1 becomes the "Vint-ELVDD".

In yet another embodiment, the electronic device 500 may not supply the second light emission signal EM2 to the first pixel P1 while the display 530 (or the display panel 310 of FIG. 3) is controlled to be in a partial display state. Accordingly, while the display 530 of the electronic device 500 is controlled to be in a partial display state, the sixth TFT T6 of the first pixel P1 may be turned off and the OLED may not emit light.

The electronic device 500 according to various embodiments may reduce the deviation of the features (e.g., luminance, color) of the first pixel P1 and the features (e.g., luminance, color) of the second pixel P2 and may reduce the afterimages even if the first pixel P1 is deactivated for a long time by having the driving TFT (i.e., the first TFT T1) of the deactivated pixel P1 maintain the bias state while the display 530 (or the display panel 310 of FIG. 3) is controlled to be in a partial display state.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing;

a display in which a display panel including a plurality of pixels is divided into a first area and a second area;

a display driver integrated circuit (DDI) for driving the display panel; and at least one processor, wherein each of the plurality of pixels comprises:

a first thin film transistor (TFT), a second TFT for switching a connection between a data line of the display panel to which a data voltage is supplied and a source of the first TFT based on a first gate signal, a third TFT for switching a connection between a gate of the first TFT and a drain of the first TFT based on a second gate signal, a fourth TFT supplying a first initialization voltage to the gate of the first TFT based on a third gate signal, a fifth TFT for switching a connection between a positive driving voltage line of the display panel to which a positive driving voltage is supplied and the source of the first TFT based on a light emission signal, a sixth TFT connecting the drain of the first TFT and an anode of an organic light emitting diode (OLED) based on the light emission signal, a seventh TFT supplying a second initialization voltage to the anode of the OLED based on a fourth gate signal, and a storage capacitor disposed between the gate of the first TFT and the positive driving voltage line, wherein the at least one processor controls:

the display panel to be in a partial display state in which the first area is deactivated and the second area is activated in response to a specified event, first pixels corresponding to the first area by dividing each frame into a first sub-period and a second sub-period while the display panel is controlled to be in the partial display state, the first pixels to receive a data voltage corresponding to an inactive state through the second TFT by supplying the first gate signal to the first pixels in the first sub-period, and the first pixels to receive a bias voltage through the second TFT by supplying the first gate signal to the first pixels in the second sub-period, and wherein the first pixels maintain the first TFT in a bias state by receiving the bias voltage in the second sub-period.

2. The electronic device of claim 1, wherein the bias state is a state in which the difference between a gate voltage of the first TFT and a source voltage of the first TFT is "Vdata+Vth−Vbias", and wherein Vdata is a value corresponding to the data voltage, Vth is a threshold voltage of the first TFT, and Vbias is a value corresponding to the bias voltage.

3. The electronic device of claim 2, wherein the bias voltage is equal to the positive driving voltage.

4. The electronic device of claim 1 further disposing in a non-display area of the display panel:

a first gate driving circuit for supplying the first to fourth gate signals and the light emission signal to first pixels corresponding to the first area;

a second gate driving circuit for supplying the first to fourth gate signals and the light emission signal to second pixels corresponding to the second area;

a first GW start signal line for transferring the first GW start signal output from the DDI to the first gate driving circuit; and a second GW start signal line for transferring the second GW start signal output from the DDI to the second gate driving circuit.

5. The electronic device of claim 4, wherein the DDI outputs the first GW start signal when the first sub-period starts, wherein the first gate driving circuit sequentially supplies the first gate signal to the first pixels in response to the first GW start signal input through the first GW start signal line during the first sub-period, wherein the DDI outputs the first GW start signal when the second sub-period starts, and wherein the first gate driving circuit sequentially supplies the first gate signal to the first pixels in response to the first GW start signal input through the first GW start signal line during the second sub-period.

6. The electronic device of claim 4, wherein the DDI outputs the second GW start signal when each frame starts, and wherein the first gate driving circuit sequentially supplies the first gate signal to the second pixels in response to the second GW start signal input through the second GW start signal line.

7. The electronic device of claim 4 further disposing in a non-display area of the display panel:

a first EM start signal line for transferring the first EM start signal output from the DDI to the first gate driving circuit; and a second EM start signal line for transferring the second EM start signal output from the DDI to the second gate driving circuit.

8. The electronic device of claim 7, wherein the DDI does not output a first EM start signal while the display panel is controlled to be in the partial display state, and wherein the first gate driving circuit does not supply the light emission signal to the first pixels by not receiving the first EM start signal while the display panel is controlled to be in the partial display state.

9. The electronic device of claim 7, wherein the DDI outputs the second EM start signal when each frame starts, and wherein the second gate driving circuit sequentially supplies the light emission signal to the second pixels in response to the second EM start signal input through the second EM start signal line.

10. The electronic device of claim 1, wherein a first area of the display slides out of an inner space of the housing in association with movement of at least a portion of the housing in a first direction, wherein a first area of the display slides into the inner space of the housing in association with movement of at least a portion of the housing in a second direction opposite to the first direction, and wherein a second area of the display is visually visible from an outside in a fixed manner regardless of the movement of the housing.

11. The electronic device of claim 10, wherein the specified event comprises an operation of the at least one processor detecting a state in which the first area of the display slides into the inner space of the housing.

12. A method for driving an electronic device including a display in which a display panel including a plurality of pixels is divided into a first area and a second area, the method comprising:

controlling the display panel to be in a partial display state in which the first area is deactivated and the second area is activated in response to a specified event;

controlling first pixels corresponding to the first area by dividing each frame into a first sub-period and a second sub-period while the display panel is controlled to be in the partial display state;

controlling the first pixels to receive a data voltage corresponding to an inactive state by supplying a first gate signal to the first pixels in the first sub-period;

controlling the first pixels to receive a bias voltage by supplying the first gate signal to the first pixels in the second sub-period; and each of the first pixels maintains a driving thin film transistor (TFT) in a bias state by receiving the bias voltage in the second sub-period.

13. The method of claim 12, wherein the bias state is a state in which the difference between a gate voltage of the driving TFT and a source voltage of the driving TFT is "Vdata+Vth−Vbias", and wherein Vdata is a value corresponding to the data voltage, Vth is a threshold voltage of the driving TFT, and Vbias is a value corresponding to the bias voltage.

14. The method of claim 13, wherein the bias voltage is equal to a positive driving voltage.

15. The method of claim 12 further comprising:

outputting, by a display driver integrated circuit (DDI) driving the display panel, a first GW start signal when the first sub-period starts;

sequentially supplying, by a first gate driving circuit, the first gate signal to the first pixels in response to the first GW start signal during the first sub-period;

outputting, by the DDI, the first GW start signal when the second sub-period starts; and sequentially supplying, by the first gate driving circuit, the first gate signal to the first pixels in response to the first GW start signal during the second sub-period.

* * * * *